United States Patent
Stoicov et al.

(10) Patent No.: US 10,223,338 B2
(45) Date of Patent: Mar. 5, 2019

(54) VISUAL DESIGNER FOR EDITING LARGE SCHEMALESS XML FILE

(71) Applicant: VMware, Inc., Palo Alto, CA (US)

(72) Inventors: Boris Stoicov, Sofia (BG); Zdravko Ivanov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 304 days.

(21) Appl. No.: 15/168,250

(22) Filed: May 31, 2016

(65) Prior Publication Data
US 2017/0344227 A1   Nov. 30, 2017

(51) Int. Cl.
| | |
|---|---|
| G06F 17/00 | (2006.01) |
| G06F 17/22 | (2006.01) |
| H04L 12/24 | (2006.01) |
| G06F 17/30 | (2006.01) |
| G06F 8/20 | (2018.01) |
| G06F 3/0484 | (2013.01) |
| G06F 17/24 | (2006.01) |
| G06F 17/27 | (2006.01) |

(52) U.S. Cl.
CPC ...... *G06F 17/2247* (2013.01); *G06F 3/04842* (2013.01); *G06F 8/20* (2013.01); *G06F 17/24* (2013.01); *G06F 17/2725* (2013.01); *G06F 17/30126* (2013.01); *H04L 41/0266* (2013.01); *H04L 41/22* (2013.01); *H04L 41/0233* (2013.01)

(58) Field of Classification Search
CPC .............................. G06F 3/04842; G06F 8/20
See application file for complete search history.

(56) References Cited

U.S. PATENT DOCUMENTS

2004/0003371 A1* 1/2004 Coulthard ............... G06F 8/24
717/101

OTHER PUBLICATIONS

Clayberg et al., "Eclipse Plug-ins, Third Edition," published Dec. 11, 2008, 13 pages total, including p. 99-105.*
Kapolka et al., "A Unified Component Framework for Dynamically Extensible Virtual Environments" CVE '02, Sep. 30-Oct. 2, 2002, Bonn, Germany, p. 64-71.*
Kim et al., "Multi-Platform Document-Oriented GUIs" Copyright 2009, Australian Computer Society, Inc., Proc. Tenth Australasian User Interface Conference (AUIC2009), Wellington, New Zealand, p. 27-34.*
Masso et al., "Towards Virtualization of User Interfaces based on UsiXML" Copyright 2005 by the Association for Computing Machinery, Inc., p. 169-178.*

(Continued)

*Primary Examiner* — Amelia L Tapp
(74) *Attorney, Agent, or Firm* — Clayton, McKay & Bailey, PC

(57) ABSTRACT

A method for a XML editor includes loading one or more files, extracting elements that extend a browser user interface from the one or more files, and presenting a graphical user interface (GUI) for editing the plug-in XML manifest file. The method further includes receiving one or more user edits to the plug-in XML manifest file through the GUI, validating the one or more user edits against properties of the elements, and generating a warning in the GUI for a user edit that conflicts with a property of an element. The method also includes generating or updating XML code in the plug-in XML manifest file in response to the one or more user edits, and saving the XML code.

19 Claims, 25 Drawing Sheets

(56) References Cited

OTHER PUBLICATIONS

"M2Eclipse", 2015, The Eclipse Foundation, Retrieved from the Internet at <URL: http://www.eclipse.org/m2e/index.html/> on May 31, 2016, 134 pages.
"vSphere Web Client Extensions Programming Guide", VMware Inc., 2016, 3 pages.

* cited by examiner

US 10,223,338 B2

VISUAL DESIGNER FOR EDITING LARGE SCHEMALESS XML FILE

BACKGROUND

The vSphere Web Client is a Web browser-based application for managing hosts, clusters, virtual machines, data storage, networking resources, and other vSphere objects that make up a vSphere virtual system. The vSphere Web Client can be extended by creating plug-in modules. Each plug-in module extends either the user interface layer or the service layer of the vSphere Web Client. The user interface plug-in modules and service plug-in modules together form a complete solution to add new capabilities to the vSphere Web Client graphical user interface.

BRIEF DESCRIPTION OF THE DRAWINGS

FIG. 4-1 is a block diagram of a XML editor for editing a plug-in XML manifest file in examples of the present disclosure.
FIG. 4-2 is a block diagram of a method for the XML editor of FIG. 4-1 to edit a plug-in XML manifest file in examples of the present disclosure.

DETAILED DESCRIPTION

Figure 1:
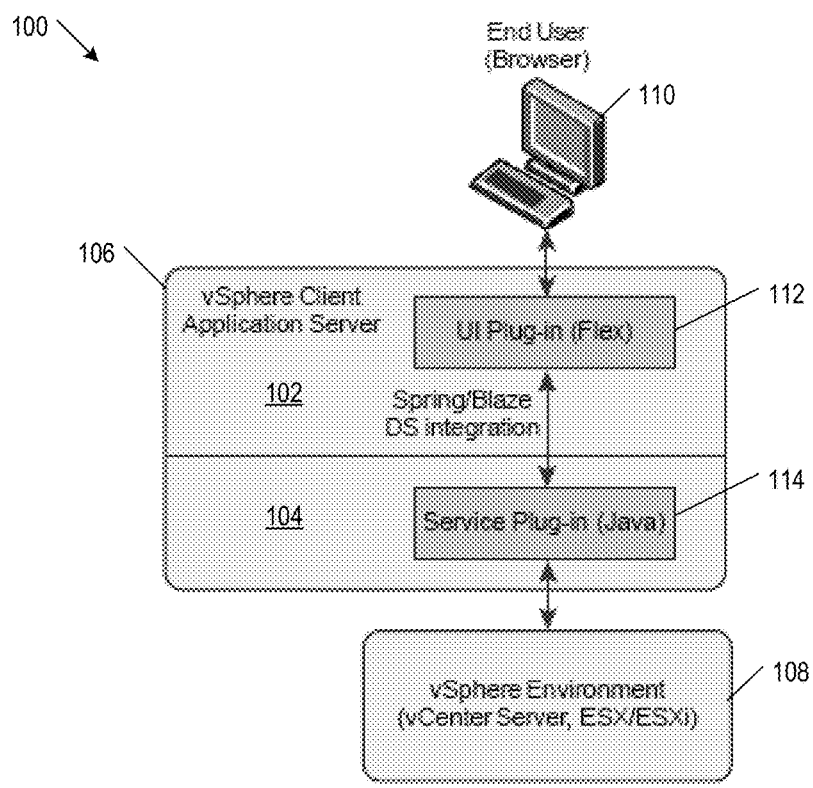
FIG. 1 shows the vSphere Web Client architecture.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 shows the vSphere Web Client architecture 100 includes a user interface (UI) layer 102 and a service layer 104. Both layers 102, 104 reside on a vSphere Web Client application server 106.

UI layer 102 includes a Flex application, called the "container application," that is displayed in the user's Web browser 110. The container application has menus, navigation elements, data portlets, commands, and other Flex UI elements.

Service layer 104 is a collection of Java services that run in a framework on the vSphere Web Client application server 106. These Java services communicate with a vCenter Server and other vSphere objects (collectively shown as vSphere environment 108), as well as other remote data sources. The Java services gather data on the virtual infrastructure (VI), which is in turn displayed to the user by UI layer 102. When the user performs an action from a Flex UI element, such as a management or administration command, the Java services perform that command on the VI.

Figure 2:
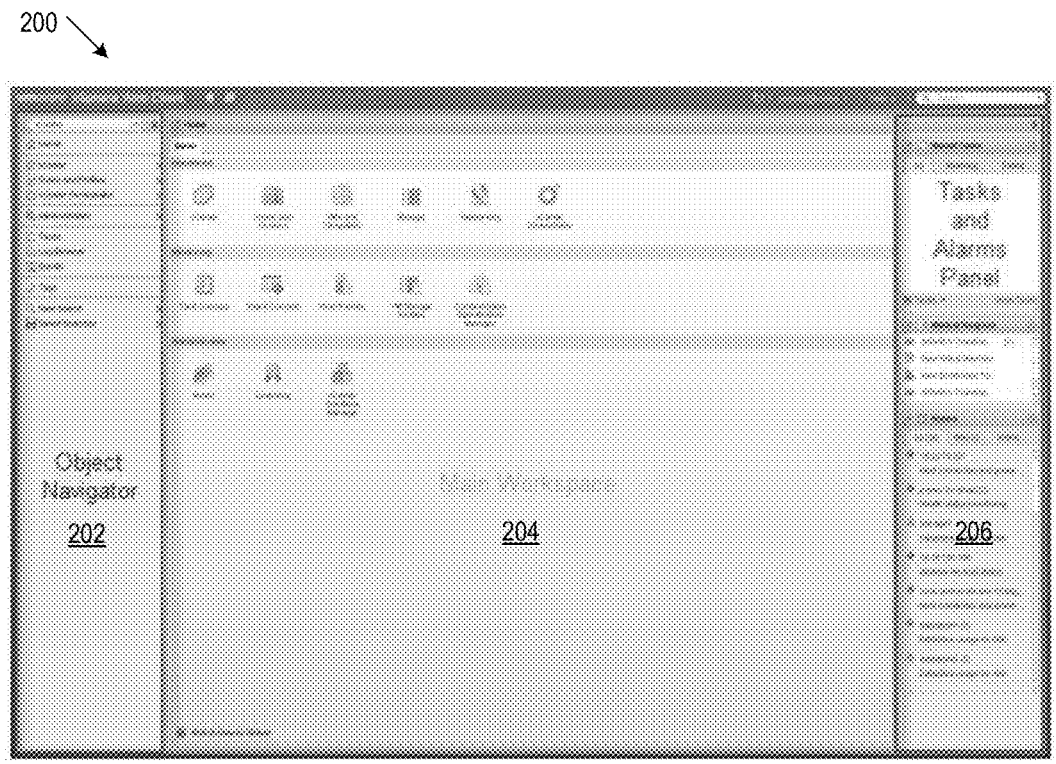
FIG. 2 shows the vSphere Web Client UI.

FIG. 2 shows the vSphere Web Client UI 200 includes an object navigator 202, a main workspace 204, and tasks and alarms panel 206. Object navigator 202 is the user's primary means of browsing the VI and accessing solutions and data views. The user's selections in object navigator 202 drive the content of main workspace 204. When the user selects a vSphere object in object navigator 202, main workspace 204 displays an object workspace that presents information about the selected vSphere object in a hierarchy of nested data. Any given vSphere object has associated Getting Started, Summary, Monitor, Manage, and Related Objects top-level tab screens. Some of these top-level tabs contain second-level tabs and views within the tabs (e.g., portlets and second-level tab views).

Figure 3:
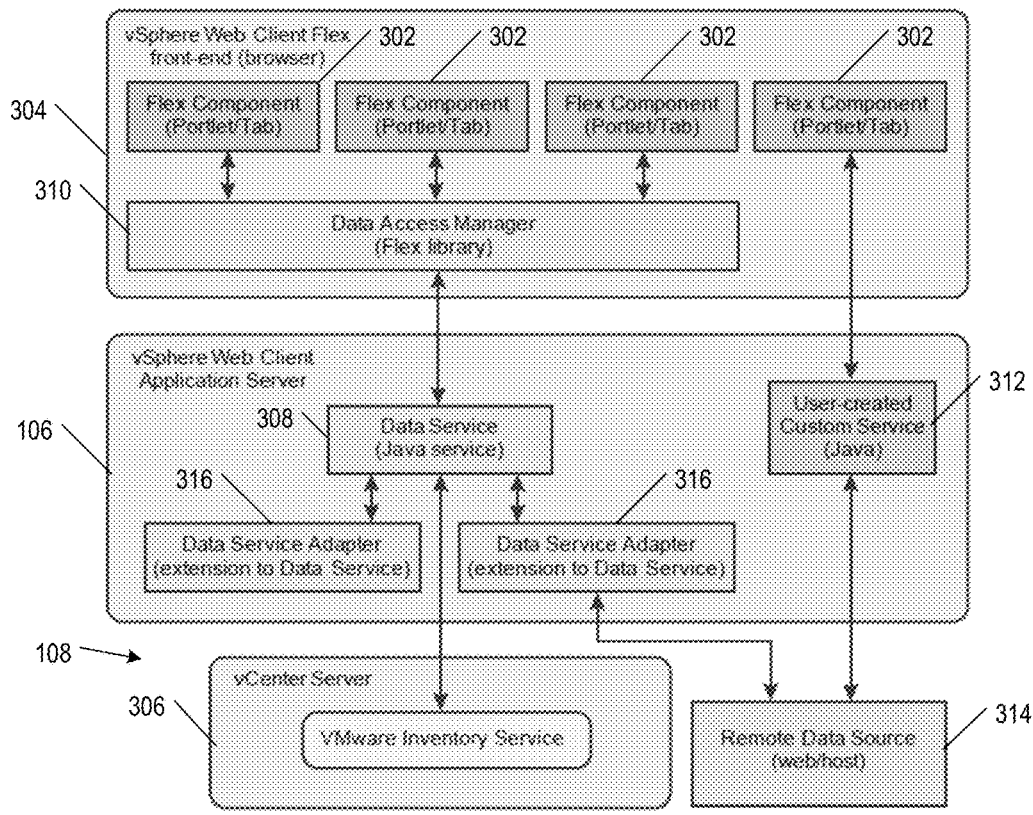
FIG. 3 shows the relationship between Flex UI elements in vSphere Web Client front end, Java components on a vSphere Web Client application server, and data sources of a vSphere environment.

FIG. 3 shows the relationship between a Flex UI elements 302 in vSphere Web Client front end 304 (container application in the user's Web browser 110), Java components on vSphere Web Client application server 106, and data sources of vSphere environment 108. Service layer 104 (FIG. 1) is a collection of Java services that run on vSphere Web Client application server 106. These Java services communicate with vCenter Server 306, ESX hosts, and other data sources within and outside of the vSphere environment 108.

The principal Java service included in service layer 104 is Data Service 308. Data Service 308 provides data on vSphere objects managed by vCenter Server 306 through a query-based information model. Components in UI layer 102, such as Flex data views, send queries to Data Service 308 for specific objects or attributes. Data Service 308 processes each query and returns responses.

Flex UI elements 302 in UI layer 102 (FIG. 1) can use a Flex library called the Data Access Manager 310 to communicate with Data Service 308 in service layer 104. Data Access Manager 310 is included with the vSphere Web Client SDK.

HTML components in UI layer 102 communicate with a controller service in service layer 104 using a REST API. The controller service can use Data Service 308 to access data about vSphere objects, or extend Data Service 308 to access a remote data source 314 outside vSphere environment 108. The controller service can also access remote data source 314 through user-created custom services 312.

Data Service 308 can be extended to process queries for new data sources. The new data can come from other sources inside vSphere virtual system 108, such as specific ESXi hosts, or from remote data source 314. When Data Service 308 is extended, GUI extension in UI layer 102 can communicate with new data sources by using the existing methods and libraries, such as Data Access Manager 310.

A Java service called a Data Service Adapter 316 can be created to extend Data Service 308. Data Service Adapter 316 can either retrieve new properties for existing vSphere objects, or it can retrieve information on new custom objects. Different types of Data Service Adapters 316 are created depending on whether new data is added to existing vSphere objects or custom objects are added to the VI.

Custom Java services 312 can be created to work with Flex UI elements 302. These custom Java services 312 are typically used for performing action operations that make changes to vSphere environment 108. Custom Java services 312 are generally used as pass-throughs to back-end processes or external data sources.

Plug-in modules 112, 114 (FIG. 1) for UI layer 102 and service layer 104 are deployed as vSphere plug-in packages. A plug-in package bundles together one or more plug-in modules 112, 114. A plug-in package includes at least one UI plug-in module 112 that adds new GUI extensions to the vSphere Web Client UI 200 (FIG. 2), and any service plug-in module 114 that includes Java services 312, 316 that are required to provide the new GUI extensions with data.

The plug-in packages are deployed to vCenter server 306 by registering with the server's Extension Manager API. When the vSphere Web Client front end 304 connects to vCenter server 306, the vSphere Web Client front end downloads and deploys any plug-in packages that are currently registered with the vCenter server.

A UI plug-in module is a Web Application ARchive (WAR) bundle. The WAR bundle contains all of the resources and Flex classes required for each GUI extension added to the vSphere Web Client UI 200 (FIG. 2). The WAR bundle includes a SWF file that contains the Flex classes that make up the UI elements of the GUI extensions.

The root folder of the WAR bundle includes a manifest file called "plugin.xml" (also referred to as "plug-in XML manifest file"). The container application uses the plug-in.xml manifest file to integrate the GUI extensions with the rest of the vSphere Web Client UI 200. The plug-in XML manifest file defines each individual GUI extension in the UI plug-in module. The plug-in XML manifest file specifies the SWF file containing the plug-in module Flex classes for the GUI extensions. If the UI plug-in module contains a GUI extension defined in HTML, the plug-in XML manifest file specifies the HTML file. The plug-in XML manifest file specifies the location of any included runtime resources in the module, such as localization data. The plug-in XML manifest file declares any extension points hosted by the UI plug-in module.

The metadata in the plug-in XML manifest file follows the format described in the vSphere Web Client SDK and the vSphere Web Client Extension Programming Guide available from VMware Inc. of Palo Alto, Calif. The XML elements of a plug-in XML manifest file include the <plugin> element, the <resources> element, and one or more <extension> elements.

The <plugin> element is the root element of the plug-in XML manifest file. All other elements are contained within the <plugin> element. The attributes of the <plugin> element contain information about the entire plug-in module. The attributes include id, moduleUri, and defaultBundle. The id attribute is a unique ID for the plug-in module. The moduleUri attribute specifies a Uniform Resource Identifier (URI) for the SWF file in the plug-in module. The SWF file contains the Flex classes used by the extensions in the plug-in module. The defaultBundle attribute specifies the name of the default resource bundle for the plug-in module.

The <resources> element specifies the location of the plug-in module's runtime resources, such as localization data. In general, resources are bundled in separate SWF files from the SWF file that contains the plug-in module Flex classes.

In the plug-in XML manifest file, each GUI extension is defined in its own <extension> element. The <extension> element includes an ID attribute, which is a unique identifier for the GUI extension. Other extensions, such as GUI extensions to the object navigator, can reference this extension using the ID attribute.

The properties of the GUI extension are described in their own elements, such as the <extendedPoint> element, the <object> element, the <metadata> element, and the <precedingExtension> element. The exact composition of extension properties varies depending on the kind of GUI element the UI plug-in module is adding to the vSphere Web Client UI 200.

The <extendedPoint> XML element contains the name of the extension point. The container application renders the GUI extension at the extension point when the plug-in module is loaded. The vSphere Web Client Extension Programming Guide publishes a set of extension points that correspond to specific locations in vSphere Web Client UI 200.

The <object> element describes the required extension object for the target extension point. The extension object is a data object that describes the properties of the extension. The extension objects associated with each extension point correspond to specific Flex classes in the vSphere Web Client SDK. The properties of the Flex class are used in the extension object to specify things like labels and icons for the extension. In the cases of data views, actions, and certain extensions to the object navigator, the extension object properties specify the Flex or HTML classes created for those extensions. Typically, the extension object is not explicitly specified in the plug-in XML manifest file because the <object> element is assumed to be an extension object of the type that the extension point requires.

The <metadata> element contains filtering data that determines when the extension is available to the user. For example, an extension may be filtered to appear for certain users or object types, or when an object's property has a certain value.

The <precedingExtension> element specifies the rendering order for the extensions in the UI plug-in module. Within each <extension> element, a <precedingExtension> element contains the ID of another extension that is to be rendered before the current extension. Setting the value of <precedingExtension> to NULL causes that extension to be rendered first.

Configuring a plug-in XML manifest file to add a GUI extension to vSphere Web Client UI 200 has many error prone steps. They include identifying the correct ID of the object type for the GUI extension, identifying the correct extension point to be extended, identifying the correct extension object to be used for the extension point, and specifying values for the properties of this extension object. Developers usually take code of an existing GUI extension as a template and modify it for their use case. This approach is prone to mistakes like duplications, reordering of GUI extensions like data views and action menus, or typos when editing the template. This approach may also lead to multiplications of existing errors and bad practices.

When such a template is not available or additional configurations are needed, developers have to find the correct type of extension object needed for the specific GUI extension, know what properties are available for setting this type of extension object, and know what these properties do and what their default values are. To find this information, developers have to check the source code or documentation. The extension properties that accept complex values, like arrays or complex types, require specific format of the values in order to be deserialized correctly by the vSphere Web Client.

When localizable resources are used, the key for a resource must be entered in specific format and developers cannot be sure if they used the correct resource key without double-checking each key and its value in the resource files. When a GUI extension like object type or extension point is deleted or edited, it can affect other extensions and even invalidate them completely.

Without validation, problems might occur on each of the steps described above. To verify their changes and catch any errors in the plug-in XML manifest file, developers have to rebuild the plug-in module, redeploy it in a running vSphere Web Client application server 106 (FIGS. 1 and 3), and test it in runtime. Sometimes, simple errors like duplicated extension IDs lead to random behavior of the GUI extension that can break not only the new or edited GUI extension but also other untouched parts of the vSphere Web Client UI 200 without showing any errors or warnings. Thus, the process of adding, editing, or deleting a simple GUI extension might turn into multiple iterations of editing, building, and redeploying a bundle or introduce a bug that will cost much more time to be caught, described, fixed and verified. These problems are direct consequence from the lack of an actual schema file and validation in every large XML files.

In examples of the present disclosure, a XML editor automates certain operations. The XML editor validates if an extension ID has a duplicate in a set of the current plug-in XML manifest file and other plug-in XML manifest files. The XML editor validates if an extended point exists in the current plug-in XML file and other plug-in XML manifest files, or the XML editor presents a list of all extension points that can be extended and let the user select from the list to avoid the possibility of specifying a wrong extended point ID. The XML editor validates that extension points are extended with the correct extension objects, or the XML editor presents the correct extension objects automatically, shows properties with their default values and documentation, and allows a user to edit the values. The XML editor validates that resource keys exist in the corresponding resource files, or the XML editor presents a list of all resource keys with their values (texts or images) and allows a user to select from the list to minimize the possibility of specifying a wrong resource key. The XML editor automates the creation of common GUI extensions (e.g., object types, object representations, data views, actions, action menus and priority groups, and object navigator extensions) by requiring only specific input from users and generates valid plug-in XML manifest code based on common configurations for these common GUI extensions. The XML editor shows a user-friendly representation of these common GUI extensions to provide instant feedback of the completed work and show how they appear in vSphere Web Client UI 200. The XML editor shows instant warning when changes to one extension affect others with a list of the affected extensions.

Figures 1, 4:
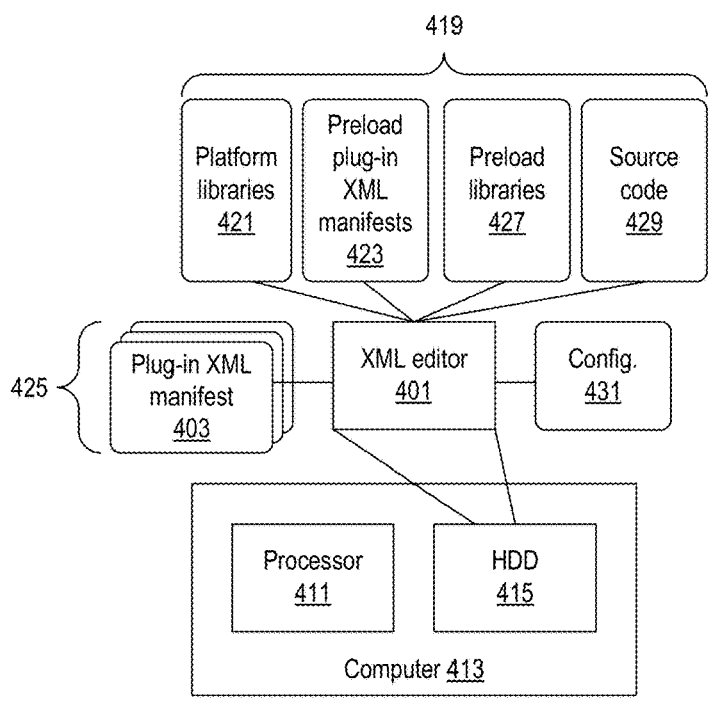
Figures 2, 4:
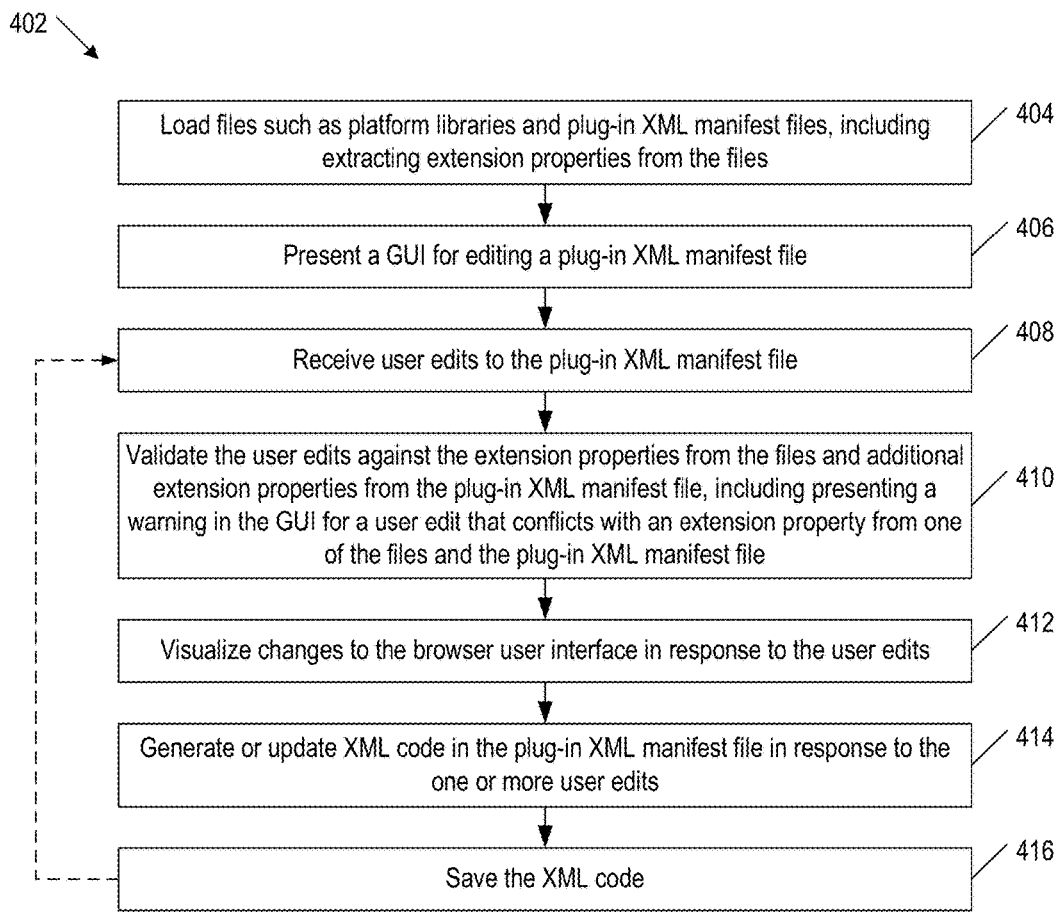

FIG. 4-1 is a block diagram of a XML editor 401 for editing a plug-in XML manifest file 403 that extend a web client UI (e.g., vSphere Web Client UI 200 in FIG. 2) for managing objects that make up a virtual system (e.g., vSphere virtual environment 108 in FIGS. 1 and 3) in examples of the present disclosure. A processor 411 on a computer 413 implements XML editor 401 by executing source code stored on a non-transitory, computer-readable storage medium, such as a hard disk drive 415. During startup, processor 411 loads files 419 to learn about the existence of fundamental extensions, extension points, extension templates, and Flex classes on top of which each plug-in XML manifest is built.

Files 419 include platform libraries 421 and preload plug-in XML manifests 423. Files 419 optionally include preload libraries 427 and source code 429 of the Flex classes.

Platform libraries 421 usually include the container-app.war file and the vsphere-client-lib.swc file from the vSphere Web Client SDK. The container-app.war file includes the Flex SDK, resources, utility and UI libraries. The vsphere-client-lib.swc file includes most object types used by the basic extensions of vSphere Web Client UI 200 (FIG. 2).

Preload plug-in XML manifests 423 are usually from the container-app and the inventory-viewer bundles. Preload plug-in XML manifests 423 include fundamental extension points, extensions, and templates (e.g., extension points defining object types, data views, actions, navigation nodes, representations, and relations).

A configuration file 431 for XML editor 401 stores the locations of files 419. Configuration file 431 optionally includes constants, such as extension IDs, extension point names, and fully qualified names of Flex classes used by XML editor 401 to provide automation for the most commonly extended extension points. Configuration file 431 may be a JSON file.

FIG. 4-2 is a block diagram of a method 402 for XML editor 401 (FIG. 4-1), implemented by processor 411 (FIG. 4-1), to edit plug-in XML manifest file 403 (FIG. 4-1) in examples of the present disclosure. Method 402 may begin in block 404.

In block 404, processor 411 loads files 419 (FIG. 4-1). As part of loading the files 419, processor 411 extracts extensions, extension points, and extension templates from the files and collects their extension properties. The extension properties include IDs of extensions, extension points, extension templates, and namespaces, reference keys of icons and labels, and names of the extension points and Flex classes. Block 404 may be followed by block 406.

In block 406, processor 411 presents a GUI for editing a plug-in XML manifest file. The GUI allows the user to open multiple plug-in XML manifest files 425 (FIG. 4-1) and select one to edit (e.g., plug-in XML manifest file 403). Processor 411 may automatically open plug-in XML manifest files that were opened during the last application session. As part of opening plug-in XML manifest files 425, processor 411 extracts extensions, extension points, extension templates, and template instances from the opened plug-in XML manifest files (including SWF and resource files they specify), collects their extension properties, validates them against each other and those collected in block 404, and generates any warnings against conflicting extension properties. The extension properties include IDs of extensions, extension templates, template instances, and namespaces, reference keys of icons and labels, and names of the extension points and Flex classes. Processor 411 records the elements' order and the comments of each opened plug-in XML manifest file 425 in order to preserve the order and the comments when the plug-in XML manifest file is saved. Block 406 may be followed by block 408.

In block 408, processor 411 receives user edits through the GUI. Block 408 may be followed by block 410.

In block 410, processor 411 validates the user edits against the extension properties found in files 419, the opened plug-in XML manifest files 425 (including SWF and resource files they specify), or all of files 419 and 425. Validating the user edits includes processor 411 generating a warning in the GUI for a user edit that conflicts with an extension property found in files 419 or the opened plug-in manifest files 425. Block 410 may be followed by block 412.

In block 412, processor 411 visualizes changes to the browser UI caused by the user edits. For example, processor 411 generates or updates a preview in the GUI of an object navigator or object workspace in the browser UI based on the user edits. Block 412 may be followed by block 414.

In block 414, processor 411 generates or updates XML code in the current plug-in XML manifest file 403 in response to the user edits. Block 414 may be followed by block 416.

In block 416, processor 411 saves the XML code to the current plug-in XML manifest file 403. Processor 411 preserves the elements' order and the comments of the current plug-in XML manifest file 403 when saving. Block 416 may loop back to block 408 to receive additional user edits.

Figure 5:
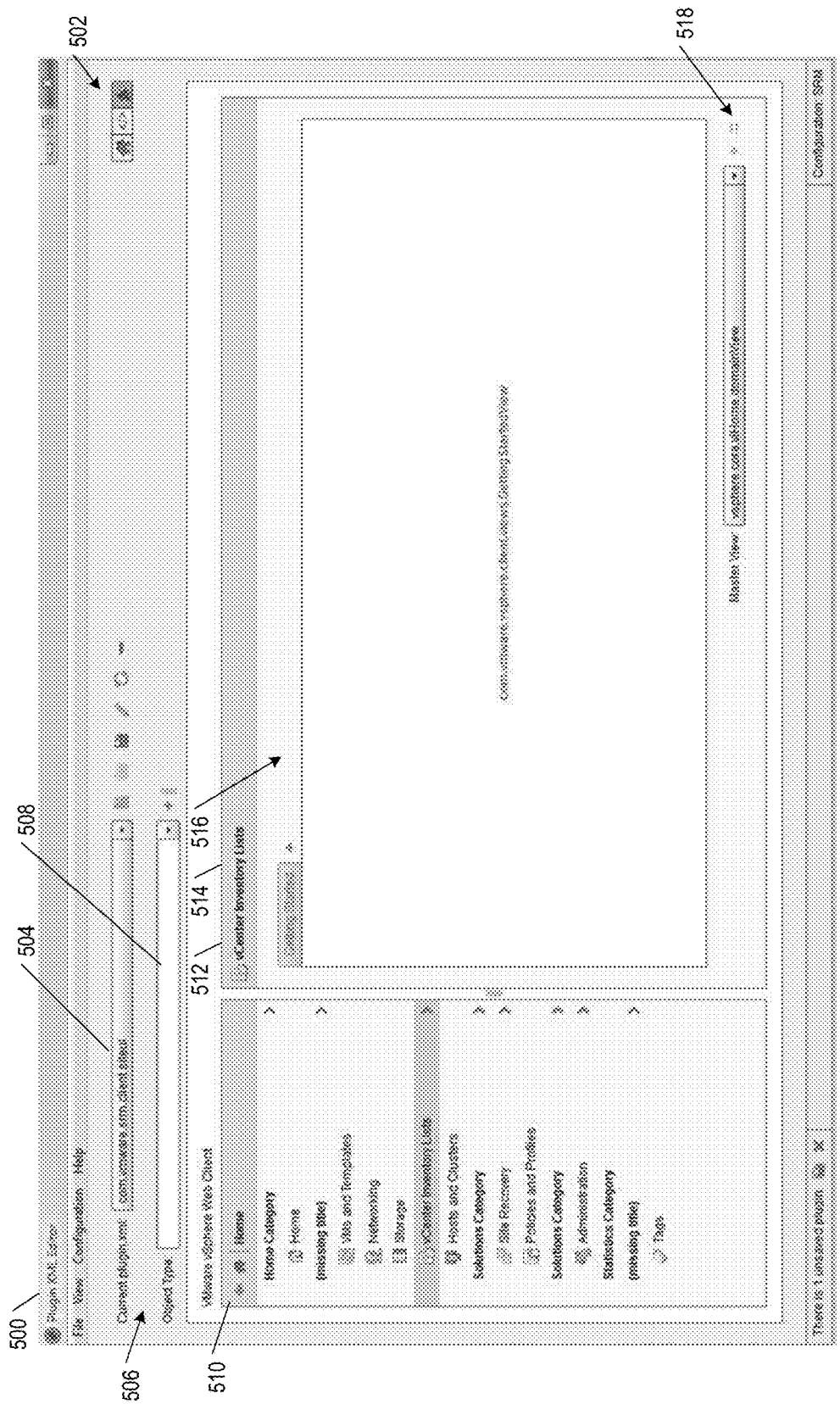
FIG. 5 is a block diagram of a GUI for the XML editor of FIG. 4-1 in a design view in examples of the present disclosure.

FIG. 5 is a block diagram of a GUI 500 of XML editor 401 (FIG. 4-1) in examples of the present disclosure. GUI 500 is switchable between three views: main, XML, and design. A perspective selector 502 and a plug-in XML manifest file selector 504 are common to all three views. Perspective selector 502 allows the user to select one of the three views. Plug-in XML manifest selector 504 is a combo box that allows the user to create, open (load), save, edit, refresh, and unload plug-in XML manifest files. Plug-in XML manifest selector 504 contains all the opened plug-in XML manifest files 425 (FIG. 4-1) listed by their IDs. Selecting one XML manifest file (e.g., plug-in XML manifest file 403 in FIG. 4-1) allows the user to see the contents of that XML manifest file and make changes.

FIG. 5 shows GUI 500 in a design view 506. Design view 506 represents the functionality of XML editor 401 visually and as natively as possible to the web client UI (e.g., vSphere Web Client UI 200 in FIG. 2). Design view 506 simplifies the creation of common extensions, such as object types, object representations (e.g., icons and labels), data views (e.g., second-level tabs, second-level tab views, and portlets), action-related functionalities (e.g., action sets, actions, action menus, and priority groups), and navigation nodes by requiring only specific input from the user for certain extension properties and providing default values for other extension properties.

Design view 506 includes an object type selector 508, an object navigator editor 510, an object representation menu 512, an action-related menu 514, and a workspace editor 516.

Object type selector 508 allows the user to create a new object type or select an existing object type from a list of object types referenced by elements in the current plug-in XML manifest files 403.

Object navigator editor 510 visually represents object navigator 202 (FIG. 2) in vSphere Web Client UI 200. Object navigator editor 510 allows the user to edit and navigate a hierarchy of navigation nodes found in files 419, the opened plug-in XML manifest files 425, or all of files 419 and 425. A navigation node may be an object collection node, a category, or a pointer node. An object collection node is added to object navigator editor 510 to provide access to a new object type. A navigation node with one or more children nodes are marked with an arrow, which can be selected to show its children. Right clicking a navigation node shows a menu for editing and adding sub-nodes, and selecting either option brings up an edit extension dialog for the current navigation node or a new sub-node.

Object representation menu 512 allows the user to add, edit, and delete object representations for an object type selected in object type selector 508. An object representation is an extension that specifies one or more icons and labels to display for a given object type, and the conditions under which each icon and label are displayed. For example, an object type has multiple icons each appearing under a different condition.

Action-related menu 514 allows the user to create, edit, and delete action-related functionalities for an object type selected in object type selector 508. An action-related functionality may be an action set, an action, an action menu, an action sub-menu, or a priority group (defines priority order for the actions in an action menu or sub-menu).

Workspace editor 516 presents a master view (extension) that visually represents an object workspace attached to an object type selected in object type selector 508 or a navigation node selected in object navigator editor 510. The master view is a new view (object workspace) extension or an instance of a view (object workspace) extension template. The user can add data views (second-level tabs, second-level tab views, and portlets) and action-related functionalities (actions, action sets, action menus, priority groups) to the master view. Workspace editor 516 is a drag-and-drop interface where the tabs and the actions in the master view are movable to edit their arrangement in the object workspace.

Figure 20:
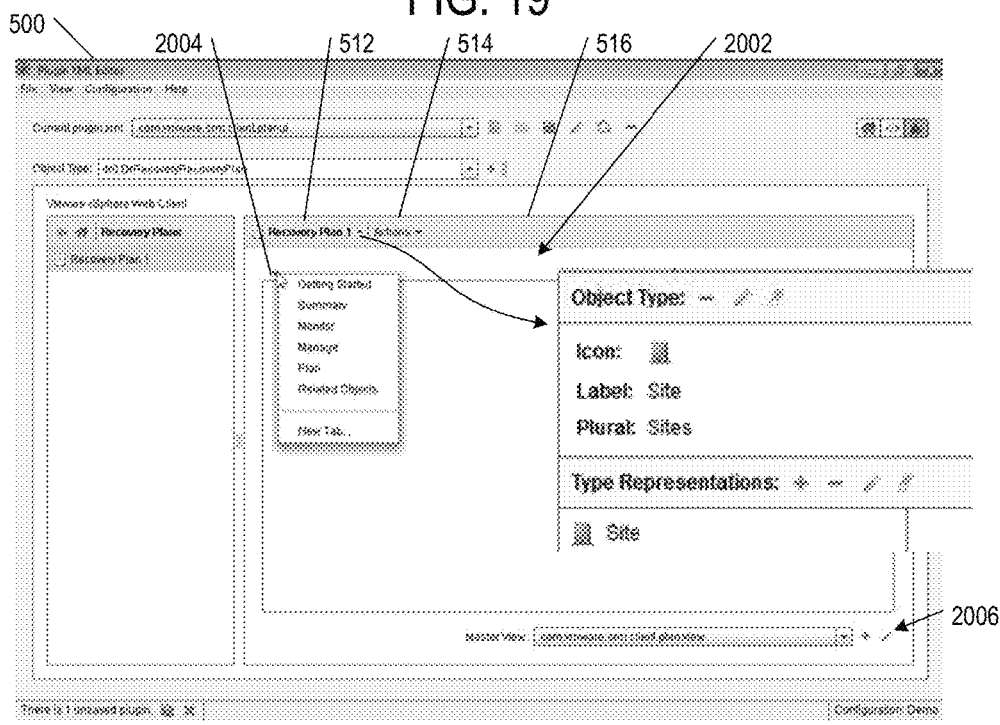

Changes to the master view are possible when the plug-in XML manifest file containing the master view is the current plug-in XML manifest file 403. A double arrow 518 indicates when the plug-in XML manifest file containing the master view is not the current plug-in XML manifest file 403. The user can click double arrow 518 to switch context from the current plug-in XML manifest file 403 to the plug-in XML manifest file containing the master view. Once the context is changed, double arrow 518 becomes an edit button 2006 (FIG. 20). The user can select edit button 2006 to bring up an edit extension dialog to edit the master view.

Figure 6:
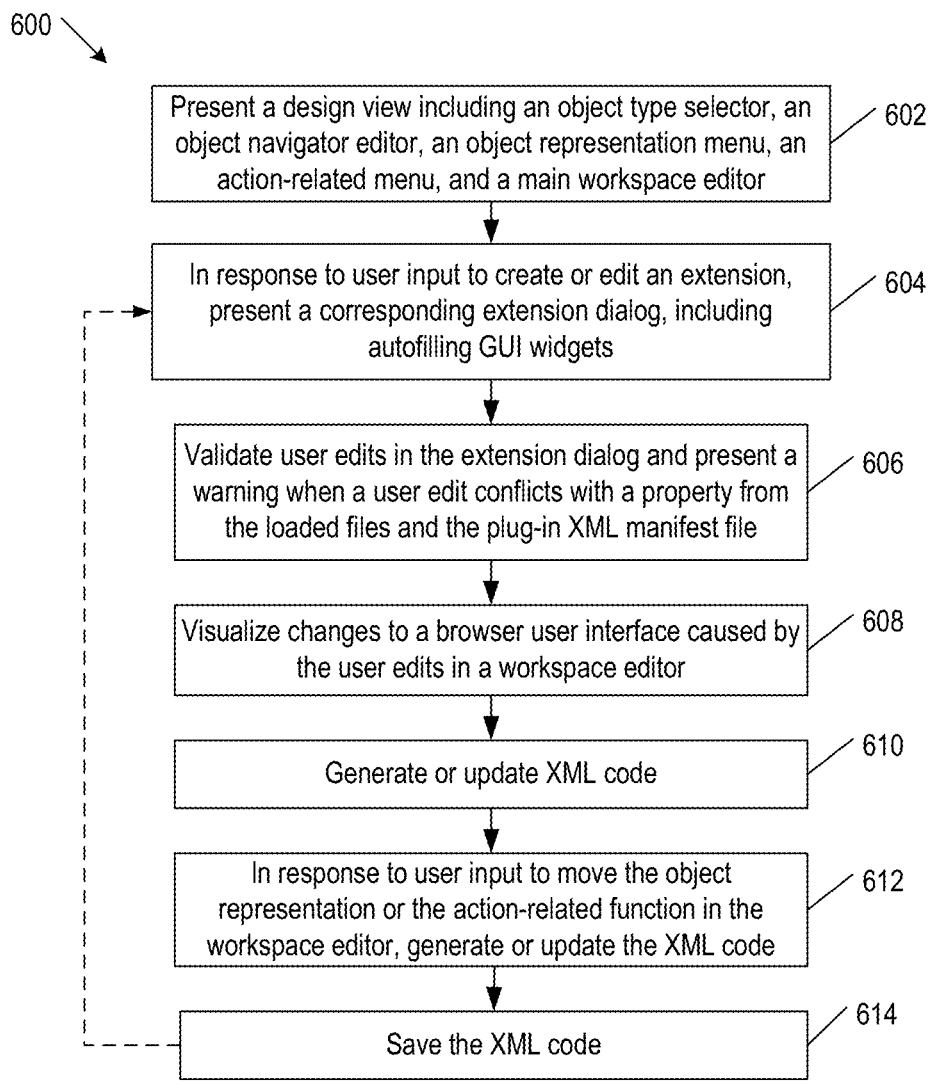
FIG. 6 is a block diagram of a method for the XML editor of FIG. 4-1 to present the design view in examples of the present disclosure.

FIG. 6 is a block diagram of a method 600 for XML editor 401 (FIG. 4-1) to present design view 506 (FIG. 5) in examples of the present disclosure. Method 600 may begin in block 602.

In block 602, processor 411 (FIG. 4) presents design view 506 including object type selector 508 (FIG. 5), object navigator editor 510 (FIG. 5), object representation menu 512 (FIG. 5), action-related menu 514 (FIG. 5), and workspace editor 516 (FIG. 5). Block 602 corresponds to block 406 in method 400. Block 602 may be followed by block 604.

In block 604, in response to the user selecting to create or edit an extension, processor 411 presents an appropriate extension dialog for editing the extension's properties based on the extension's type.

The extension may be an object type, an object representation (e.g., an icon or a label), a data view (e.g., a second-level tab, a second-level tab view, or a portlet), an action set, an action, an action menu, a priority group, or a navigation node. In the extension dialog, processor 411 presents a composition of GUI widgets for editing the extension's properties that depends on the extension's type. In other words, the extension dialog is data-driven to present the relevant GUI widgets to edit the extension's properties. Processor 411 may automatically fill a GUI widget with a default value that is commonly selected or predicated on a prior user input. An exemplary extension dialog 1400 (FIG. 14) may include one or more of the following GUI widgets, which are briefly introduced here and explained more fully in a later example.

A GUI widget 1404 (FIG. 14) allows the user to enter an extension's ID attribute. GUI widget 1404 may be a textbox. A GUI widget 1406 (FIG. 14) allows the user to select an extension point by entering the extension point's ID attribute in a field or select the extension point from a dropdown list of existing extension points found in files 419, the opened plug-in XML manifest files 425 (including the current plug-in XML manifest file 403), or all of files 419 and 425. A GUI widget 1408 (FIG. 14) allows the user to select another extension that is to be rendered before the current extension by entering the other extension's ID attribute in a field or select the other extension from a dropdown list of existing extensions found in the current plug-in XML manifest file 403. A GUI widget 1410 (FIG. 14) allows the user to select an object type as a filtering metadata by entering the object type's ID in a field or select the object type from a dropdown list of existing object types found in files 419, the opened plug-in XML manifest files 425 (including the current plug-in XML manifest file 403), or all of files 419 and 425. A GUI widget 1412 (FIG. 14) allows the user to enter text, which is added as a comment above the serialized extension in the current plug-in XML manifest file 403.

Each of GUI widgets 1406, 1408, and 1410 may be an editable combo box that presents filtered suggestions as the user type into its field. In design view 506, processor 411 may automatically fill editable combo box 1406 with an extension point based on the extension's object type.

A GUI widget 1602 (FIG. 16) allows the user to enter an object type's name, which is the string that this object type can be referenced by other extensions. GUI widget 1602 may be a textbox. GUI widgets 1604 and 1606 (FIG. 16) each allows the user to enter a string in a field or select a link resource button 1610 in the field to bring up a dialog for selecting an image resource (e.g., icon image) or a string resource (e.g., label) from a list of icon images and labels found in files 419 (e.g., resource bundles of platform libraries 421) and resource bundles specified in the opened plug-in XML manifest files 425. Once successfully bound, the field may further include a toggle button 1612 that allows the user to switch between viewing the string or the linked icon image or label. GUI widgets 1604 and 1606 each allows the user to select an insert class button 1611 in the field to bring up a dialog for selecting a Flex class from a list of Flex classes found in files 419 (e.g., SWF files of platform libraries 421) and SWF files specified in the opened plug-in XML manifest files 425. GUI widget 1604 and 1606 may be editable combo boxes.

A GUI widget 1906 (FIG. 19) allows the user to enter an extensions' namespace. GUI widget 1906 may be a textbox. A GUI widget 1908 (FIG. 19) allows the user to enter the extension's object type. GUI widget 1908 may be a textbox. A GUI widget 1910 (FIG. 19) allows the user to enter a Boolean operator (true or false) indicating if hosted extension is required. When hosted extension means is required, a top-level tab or a second-level tab is shown only when its hosted extension points have at least one extension. GUI widget 1910 may be a textbox. Processor 411 may automatically fill textbox 1910 with true when the extension (e.g., a template instance) requires host extensions.

A GUI widget 2204 (FIG. 22) allows the user to select an extension's Flex class by entering the Flex class's name or selecting an insert class button 2208 to bring up a dialog for selecting the Flex class from a list of existing Flex classes found in files 419 (e.g., SWF files of platform libraries 421) and SWF files specified in the opened plug-in XML manifest files 425. GUI widget 2204 may be an editable combo box.

Block 604 corresponds to block 408 in method 400. Block 604 may be followed by block 606.

In block 606, processor 411 validates the user edits in the extension dialog against the extension properties found in files 419, the opened plug-in XML manifest files 425 (including SWF and resource files they specify), or all of files 419 and 425. The user edit may be to an extension's ID, the extension point's ID, the extension's name, the extension's namespace, an object type's ID, a resource's key, a Boolean operator, and a Flex class's name. Validating the user edits includes processor 411 checking for duplicated extensions, extension points, extension templates, and template instances, references to missing extensions, extension points, templates, and template instances, unresolved resources, any action menu that is not attached to an object type, and missing or incomplete references to actions, data views, object types, and navigation nodes. Processor 411 generates a warning when a user edit conflicts with an extension property from files 419 or the opened plug-in XML manifest files 425. For example, processor 411 generates a warning 1608 (FIG. 16) in a field indicating the user edit of a label's resource key cannot be resolved with the resource keys in files 419. Processor 411 also generates a warning 3510 (FIG. 35) at the bottom of GUI 500, which the user may click to extend a validation panel 704 (FIG. 7) showing problematic extension elements.

Block 606 corresponds to block 410 in method 400. Block 606 may be followed by block 608.

Figure 35:
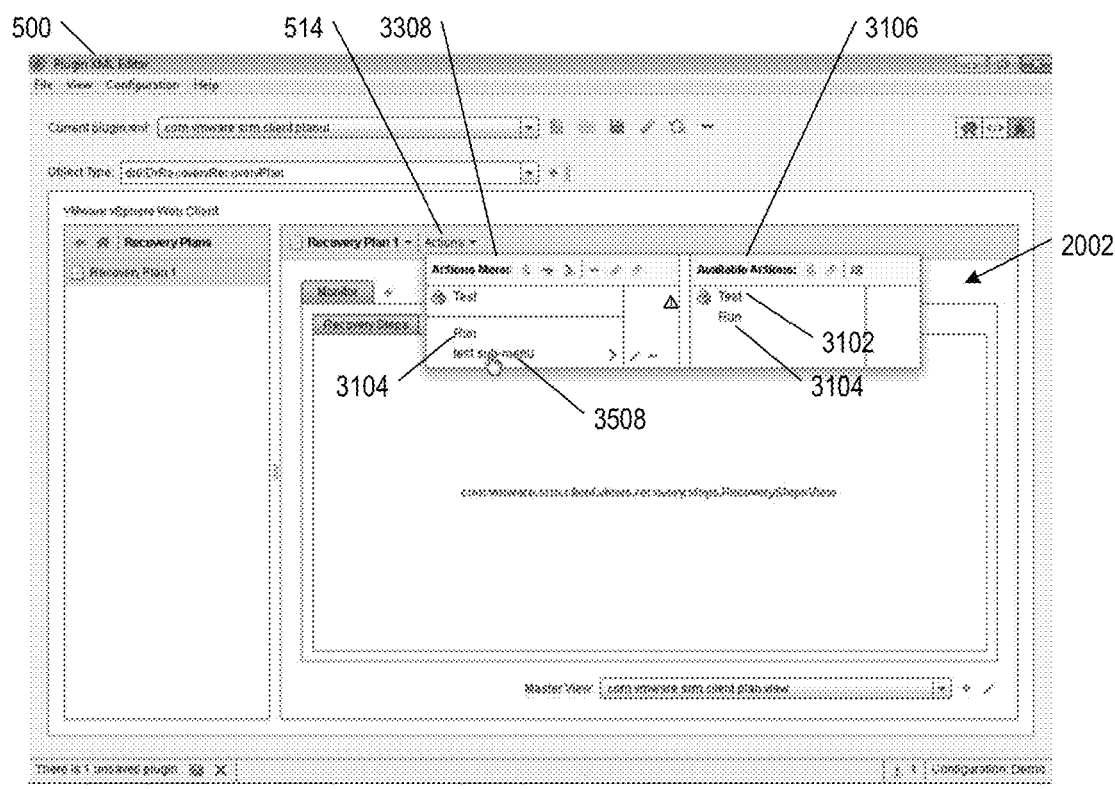

In block 608, processor 411 visualizes changes to the web client UI caused by the user edits by updating object navigator editor 510 and workspace editor 516. Object navigator editor 510 displays any new extension, such as a navigation collection node for a new object type. Workspace editor 516 displays new extensions added to an object workspace 2002 (FIG. 24), such second-level tabs 2404, 2406 (FIG. 24), action menu 3308 (FIG. 35), actions 3504, 3506 (FIG. 35), and action sub-menu 3508 (FIG. 35).

Block 608 corresponds to block 412 in method 400. Block 608 may be followed by block 610.

In block 610, processor 411 generates or updates the XML code in the current plug-in XML manifest file 403 in response to the user edits. For each extension created or edited through design view 506, processor 411 creates an <extension> element and fills it with the extension properties under their own elements. Block 610 corresponds to block 414 in method 400. Block 610 may be followed by block 612.

Figure 24:
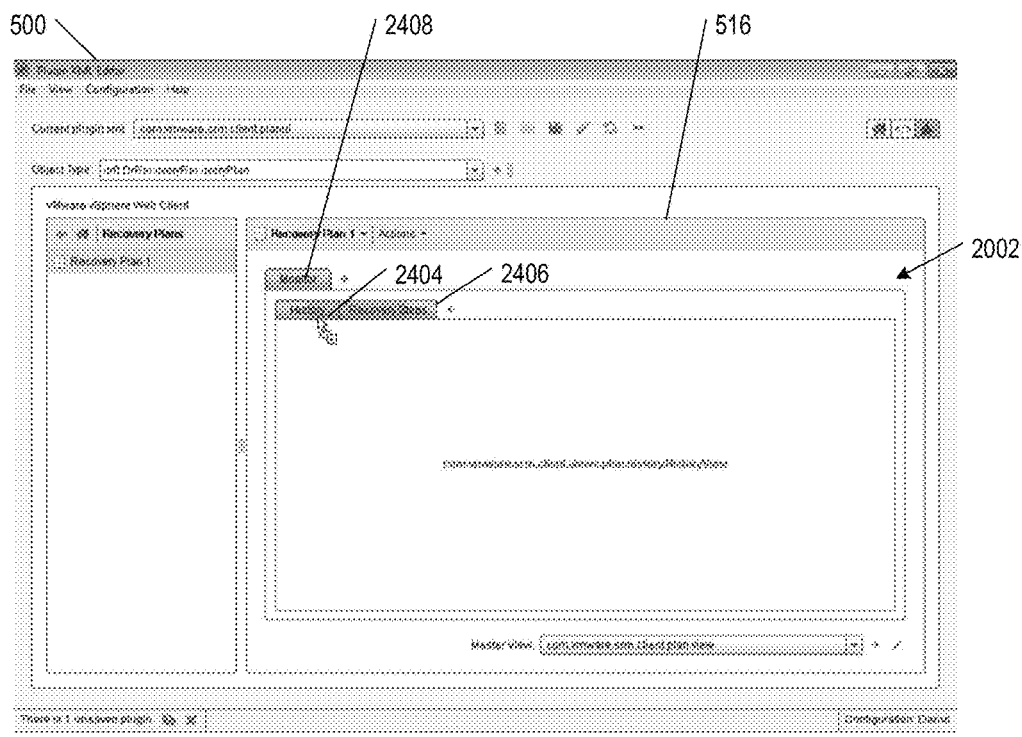
Figure 25:
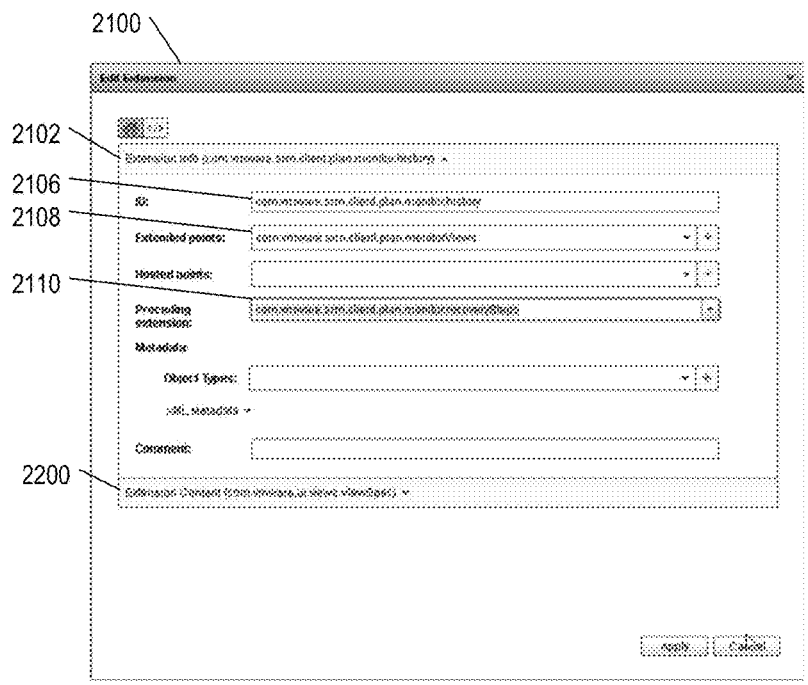

In block 612, in response to user input moving a data view (e.g., a second-level tab) or an action-related functionality (e.g., an action) in workspace editor 516, processor 411 generates or updates the XML code in the current plug-in XML manifest file 403. For example, the user may drag and place second-level tab 2406 (FIG. 24) ahead of second-level tab 2404 (FIG. 24). In response, processor 411 updates each extension's preceding extension property in the XML code and the new property value appears in the extension's dialog. In another example, the user may drag and place a second-level tab from one first-level tab to another. In response, processor 411 updates the second-level tab's extension point property in the XML code and the new property value appears in the extension's dialog. Block 612 may be followed by block 614.

In block 614, processor 411 saves the XML code to the current plug-in XML manifest file 403. Processor 411 preserves the elements' order and the comments of the current plug-in XML manifest file 403 when saving. Block 614 corresponds to block 416 in method 400. Block 614 may loop back to block 604 to receive additional user edits.

Figure 7:
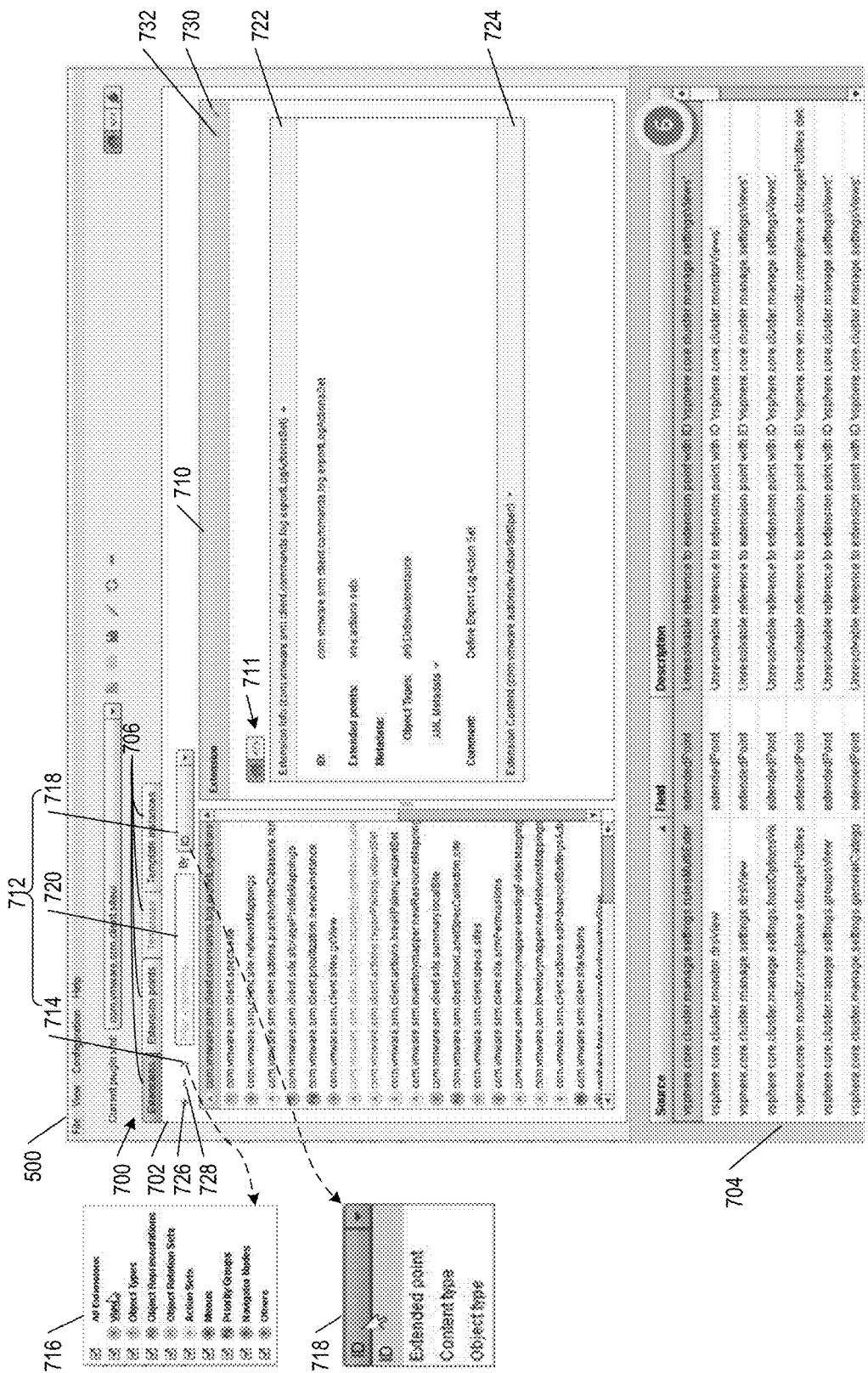
FIG. 7 is a block diagram of the GUI of FIG. 5 in a main view in examples of the present disclosure.

FIG. 7 shows GUI 500 in a main view 700 in examples of the present disclosure. Main view 700 presents a UI to create every type of extension. Main view 700 includes an inspector panel 702 and a validation panel 704 (shown extended). Inspector panel 702 includes inspector perspective tabs 706, an element list 708, an inspection area 710, and a filter menu 712.

Inspector perspective tabs 706 allow the user to select a XML element type from four XML element types in plug-in XML manifest files. The four XML element types are extension element, extension point element, extension template element, and an extension template instance element.

Element list 708 shows XML elements in the current plug-in XML manifest file 403 that are the XML element type selected via inspector perspective tabs 706. Element list 708 allows the user to select, add, or remove a XML element that is an extension, an extension point, an extension template, or a template instance.

Inspection area 710 shows the selected XML element. Inspection area 710 includes a perspective selector 711 that switched the inspection area between a structured view of the XML element's extension properties and a XML view of the XML element's XML snippet. In the structured view, the extension properties are viewed in two read-only panels: an upper panel 722 containing basic extension information and a lower panel 724 containing extension content and content type. The user may select an edit button 730 to open an edit extension dialog to edit the selected element. The edit extension dialog has fields providing auto-completion with the IDs of extension points, extensions, and object types from the opened plug-in XML manifest files 425. The user may select a revert button 732 to revert the selected XML element to its original state if the current plug-in XML file 403 has not been saved.

Filter menu 712 includes a filter button 714 that activates a checklist 716 with the various extension types. The user selects the extension types to filter element list 708. Filter menu 712 also includes a property dropdown list 718 and a search string textbox 720 to filter element list 708. Property dropdown list 718 allows the user to select an extension property (e.g., ID, extended point, content type, or object type), and search string textbox 720 allows the user to specify a search string.

The user selects an add button 726 to open a new extension dialog to add a new XML element. The user selects a remove button 728 to mark a selected XML element for deletion. In response, XML editor 401 generates a popup warning that lists XML elements in the opened plug-in XML manifest files 425 that reference the marked element. The user may select a number of such XML elements to delete their references to the marked element. XML editor 401 deletes the marked element and the references to the marked element when the user selects to save the current plug-in XML manifest file 403. Prior to saving, the user may restore (undelete) the marked element and the references to the marked element.

Validation panel 704 includes a list of problematic XML elements for selecting a problematic XML element. The problematic XML elements are determined from validating the user edits against the extension properties found in files 419, the opened plug-in XML manifest file 425 (including SWF and resource files they specify), or all of files 419 and 425. In response to the user selecting a problematic XML element in validation panel 704, processor 411 (FIG. 4-1) updates inspector panel 702 to select an inspector perspective tab 706 with the corresponding XML element type, select the problematic XML element in element list 708, and display the summary view or the XML view of the problematic XML element in inspection area 710.

Figure 8:
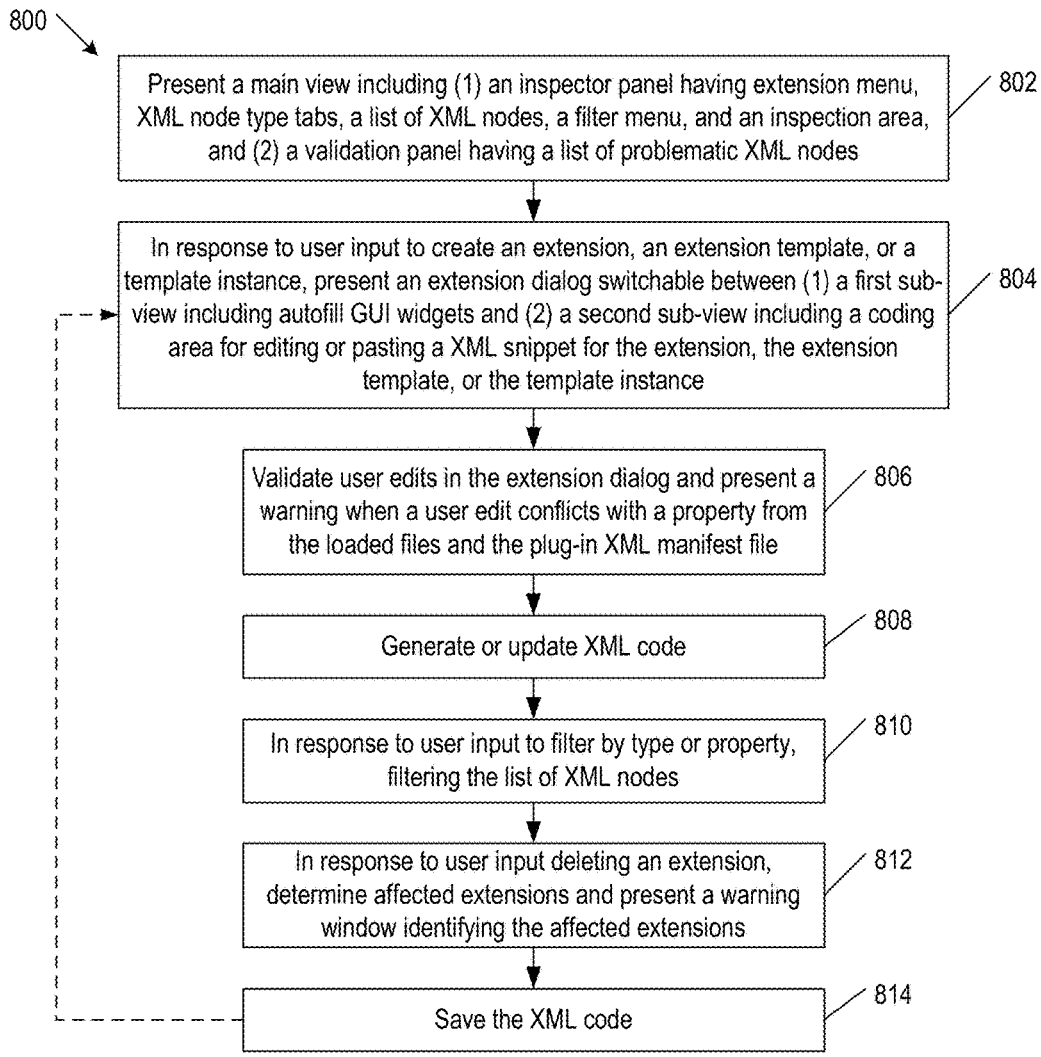
FIG. 8 is a block diagram of a method for XML editor of FIG. 4-1 to present the main view of FIG. 7 in examples of the present disclosure.

FIG. 8 is a block diagram of a method 800 for XML editor 401 to present main view 700 in examples of the present disclosure. Method 800 may begin in block 802.

In block 802, processor 411 presents main view 700 including inspector panel 702 and validation panel 704. Inspector panel 702 includes inspector perspective tabs 706, extension list 708, inspection area 710, and filter menu 712. Block 802 corresponds to block 406 in method 400. Block 802 may be followed by block 804.

Figure 36:
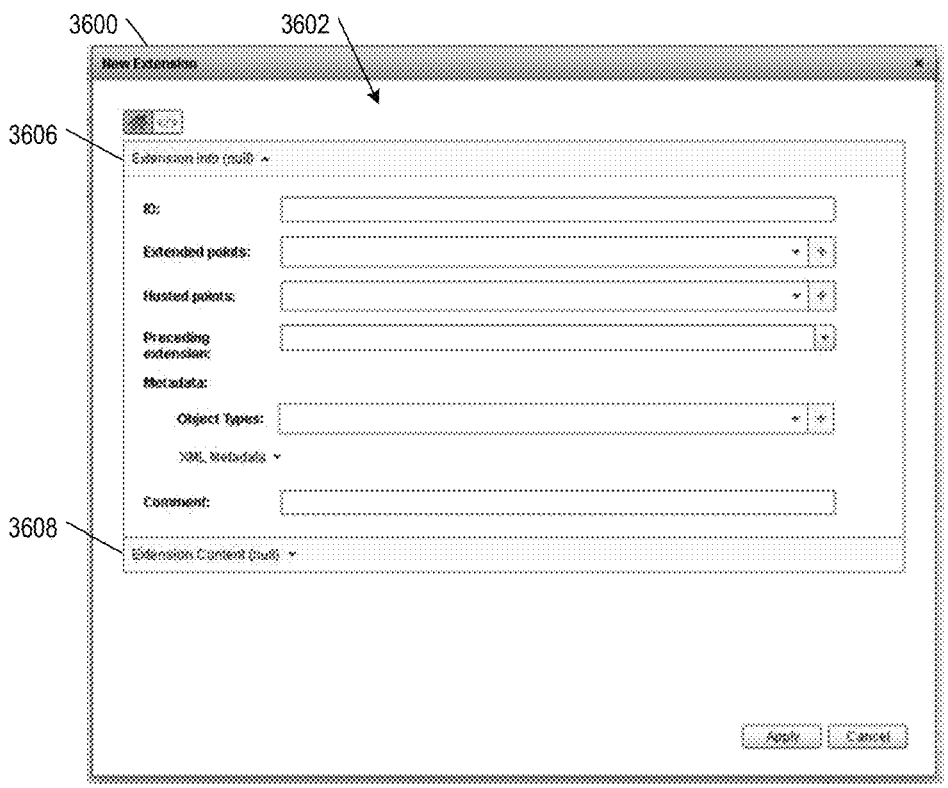
FIGS. 36 and 37 show summary and XML views in the main view of FIG. 7 in examples of the present disclosure.
Figure 37:
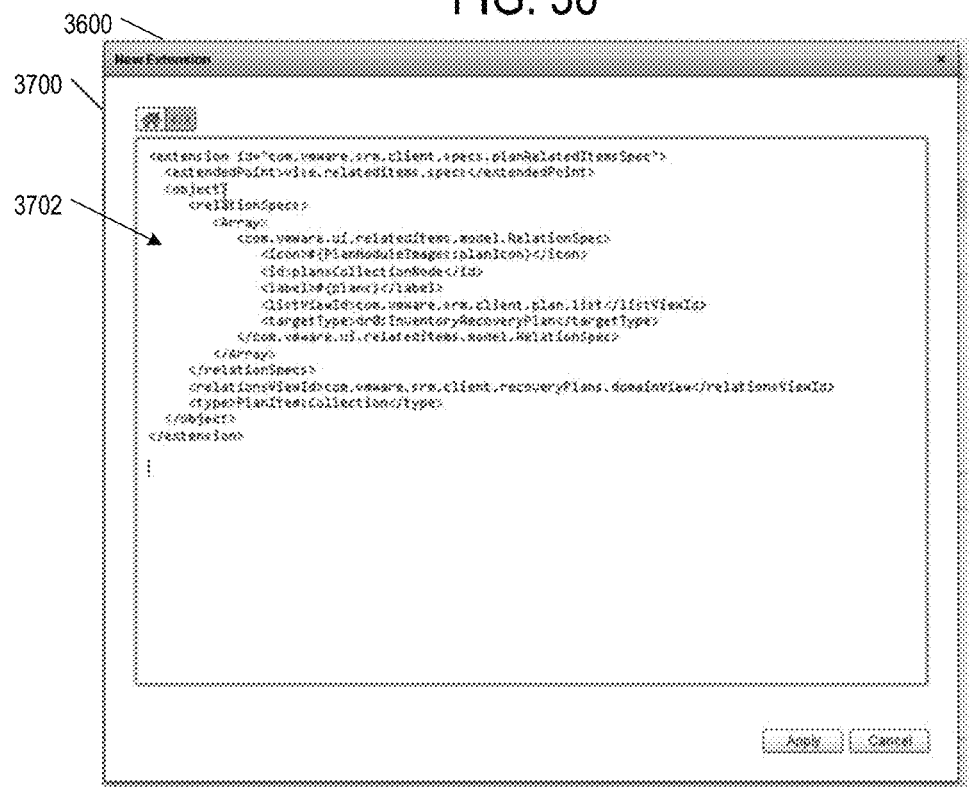

In block 804, in response to the user selecting to create or edit an XML element, processor 411 presents an appropriate extension dialog for creating or editing the XML element based on the XML element's type. The XML element type may be extensions, extension points, extension templates, or template instances. FIGS. 36 and 37 show an extension dialog 3600 that is switchable between a summary view 3602 (FIG. 36) and an XML view 3700 (FIG. 37) in examples of the present disclosure.

Summary view 3602 shows a summary of the selected XML element's extension properties. Summary view 3602 includes an extension information area 3606 and an extension content area 3608 that include GUI widgets for editing the selected XML element's extension properties. The composition of the GUI widgets varies depending on the XML element's type. For example, the GUI widgets include those previously described for design view 506 (FIG. 5).

XML view 3700 includes a coding area 3702 for editing or pasting the extension's XML snippet. When the user pastes a XML snippet into coding area 3702, processor 411 parses the extension properties from the XML snippet so their values are shown in summary view 3602.

Block 804 corresponds to block 408 in method 400. Block 804 may be followed by block 806.

In block 806, processor 411 validates the user edits in the extension dialog against the extension properties found in files 419, the opened plug-in XML manifest files 425 (including SWF and resource files they specify), or all of files 419 and 425. The user edit may be to an extension's ID, the extension point's ID, the extension's name, the extension's namespace, an object type's ID, a resource's key, a Boolean operator, and a Flex class's name. Validating the user edits includes processor 411 checking for duplicated extensions, extension points, extension templates, and template instances, references to missing extensions, extension points, templates, and template instances, unresolved resources, any action menu that is not attached to an object type, and missing or incomplete references to actions, data views, object types, and navigation nodes. Processor 411 generates a warning when a user edit conflicts with an extension property from files 419 or the opened plug-in XML manifest files 425. For example, processor 411 generates a warning 1608 (FIG. 16) in a field indicating the user edit of a label's resource key cannot be resolved with the resource keys in files 419 (e.g., resource bundles of platform libraries 421) and resource bundles specified in the opened plug-in XML manifest files 425. Processor 411 also generates a warning 3510 (FIG. 35) at the bottom of GUI 500, which the user may click to extend validation panel 704 (FIG. 7) showing problematic extension elements.

Block 806 corresponds to block 410 in method 400. Block 806 may be followed by block 808.

In block 808, processor 411 generates or updates the XML code in the current plug-in XML manifest file 403 in response to the user edits. For each extension created or edited through main view02, processor 411 creates an <extension> element and fills it with the extension properties under their own elements. Block 808 corresponds to block 414 of method 400. Block 808 may be followed by block 810.

In block 810, in response to user input to filter element list 708 by an extension type or a property search string, processor 411 filters the element list. Block 810 may be followed by block 812.

Figure 38:
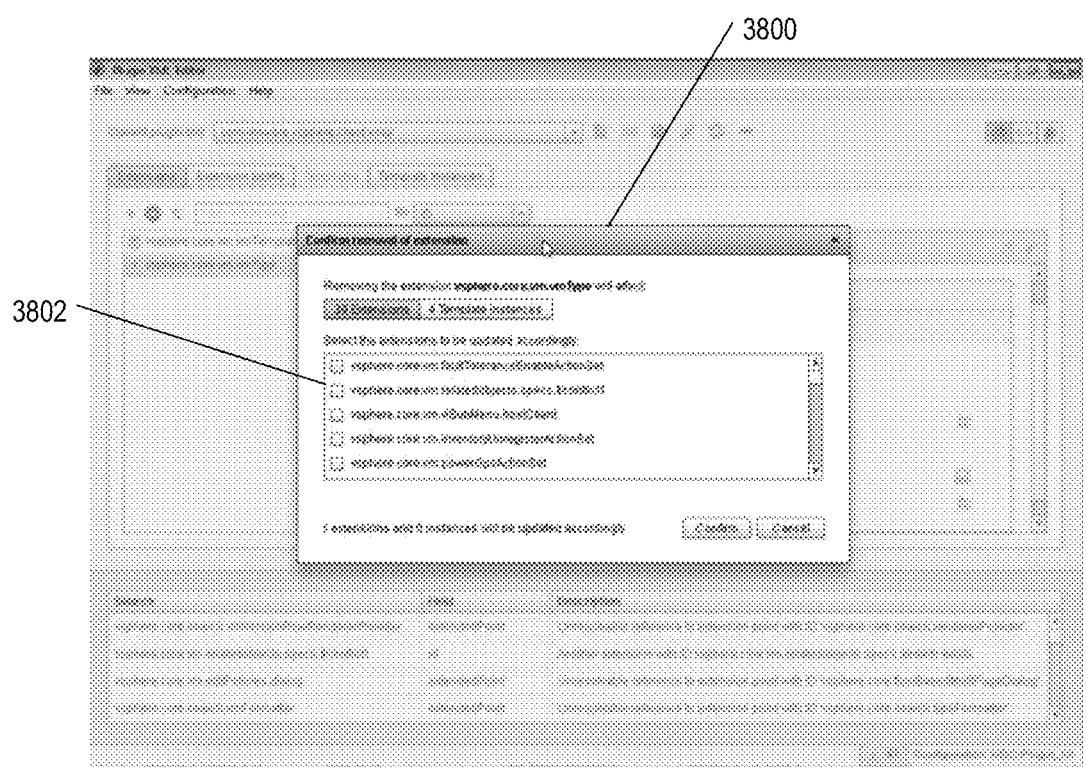
FIG. 38 shows a warning window in examples of the present disclosure.

In block 812, in response to user input selecting to delete a XML element, processor 411 marks the XML element for deletion, determines other XML elements in the opened plug-in XML files 425 that references the marked element, and generates a popup warning that lists the affected XML elements. FIG. 38 shows a warning window 3800 in examples of the present disclosure. Warning window 3800 includes a checklist 3802 of affected XML elements. To delete the references to the marked element from the affected XML elements, the user checks the affected XML elements and then confirms the selection to delete the references from the affected XML elements. XML editor 401 deletes the marked element and the references to the marked element when the user selects to save the current plug-in XML manifest file 403. Prior to saving the current plug-in XML manifest file 403, the user may restore (undelete) the marked element and the references to the marked element. Prior to saving the current plug-in XML manifest file 403, the marked element is shown in red when it appears in object navigator editor 510, workspace editor 516, and element list 708, and its XML code is shown in red in a XML view 900 (described later) of GUI 500. The marked element and references to the marked element are only deleted when the user selects to save the current plug-in XML manifest file 403. Referring back to FIG. 8, block 812 may be followed by block 814.

In block 814, processor 411 saves the XML code to the current plug-in XML manifest file 403. Block 814 corresponds to block 416 in method 400. Block 814 may loop back to block 804 to receive additional user edits.

Figure 9:
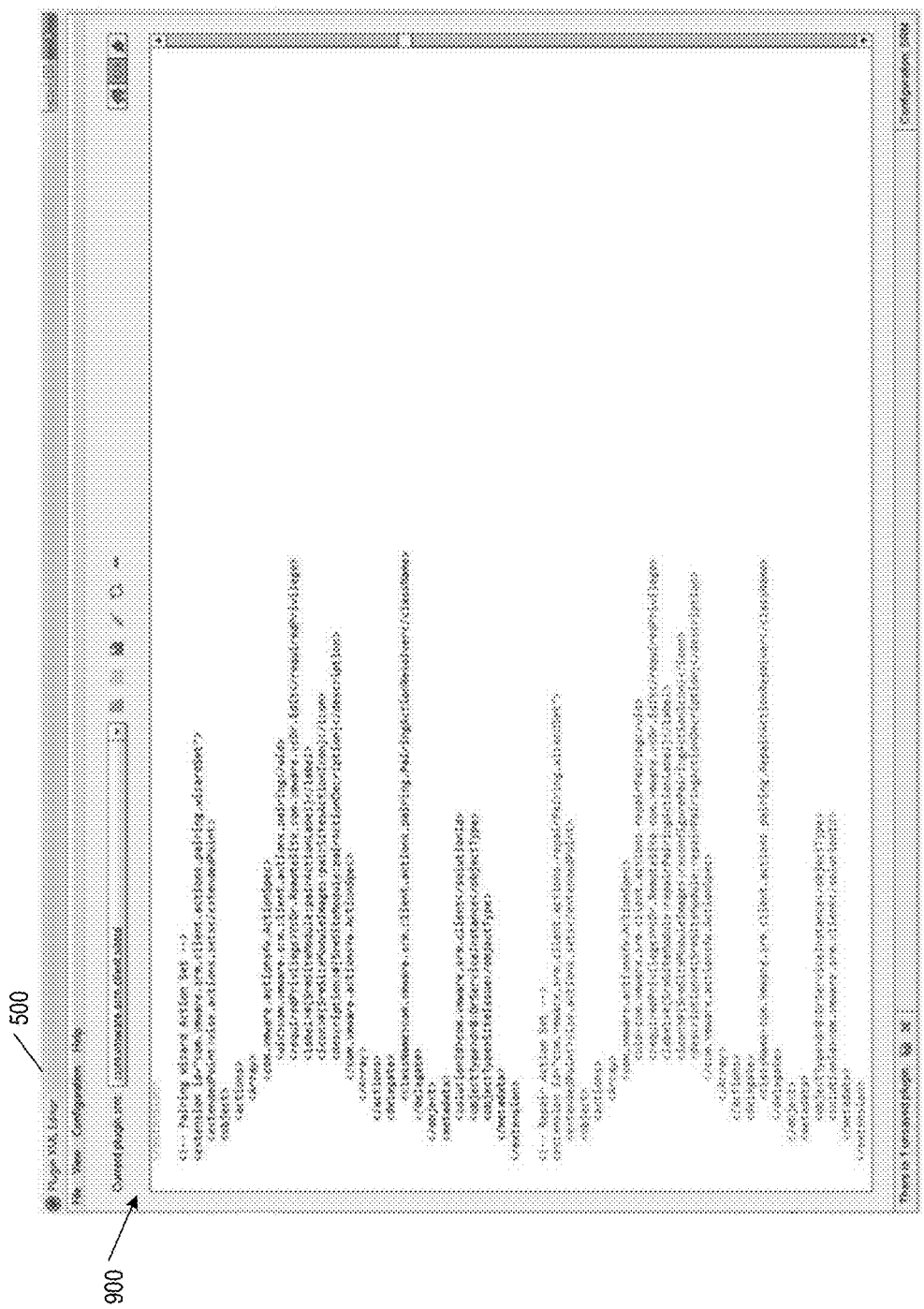
FIG. 9 is a block diagram of the GUI of FIG. 5 in a XML view in examples of the present disclosure.

FIG. 9 shows GUI 500 in an XML view 900 in examples of the present disclosure. XML view 900 shows the XML code in current plug-in XML manifest file 403 (FIG. 4-1). XML view 900 displays removed, added, and unchanged portions of the XML code in different colors. For example, XML view 900 shows portions of the XML code marked for removal in red, added portions of the XML code in yellow, and unchanged portions of the XML code in black.

Figure 10:
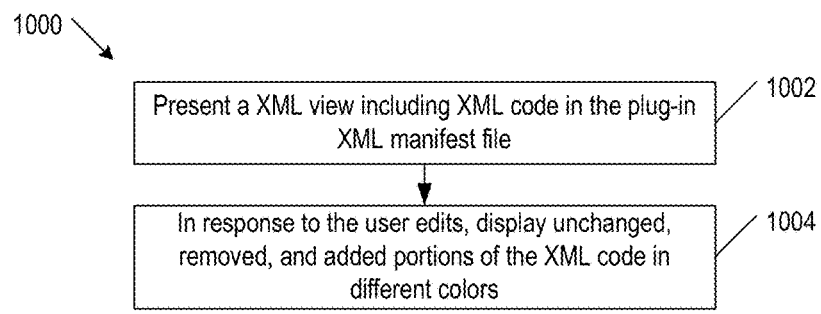
FIG. 10 is a block diagram of a method for XML editor of FIG. 4-1 to present the XML view of FIG. 9 in examples of the present disclosure.

FIG. 10 is a block diagram of a method 1000 for XML editor 401 (FIG. 4-1) to present XML view 900 (FIG. 9) in examples of the present disclosure. Method 1000 may begin in block 1002.

In block 1002, processor 411 presents XML view 900 the XML code in current plug-in XML manifest file 403 (FIG. 4-1). Block 1002 may be followed by block 1004.

In block 1004, in response to the user edits, processor 411 displays the unchanged, the marked for removal, and the added portions of the XML code in different colors in XML view 900.

Figure 11:
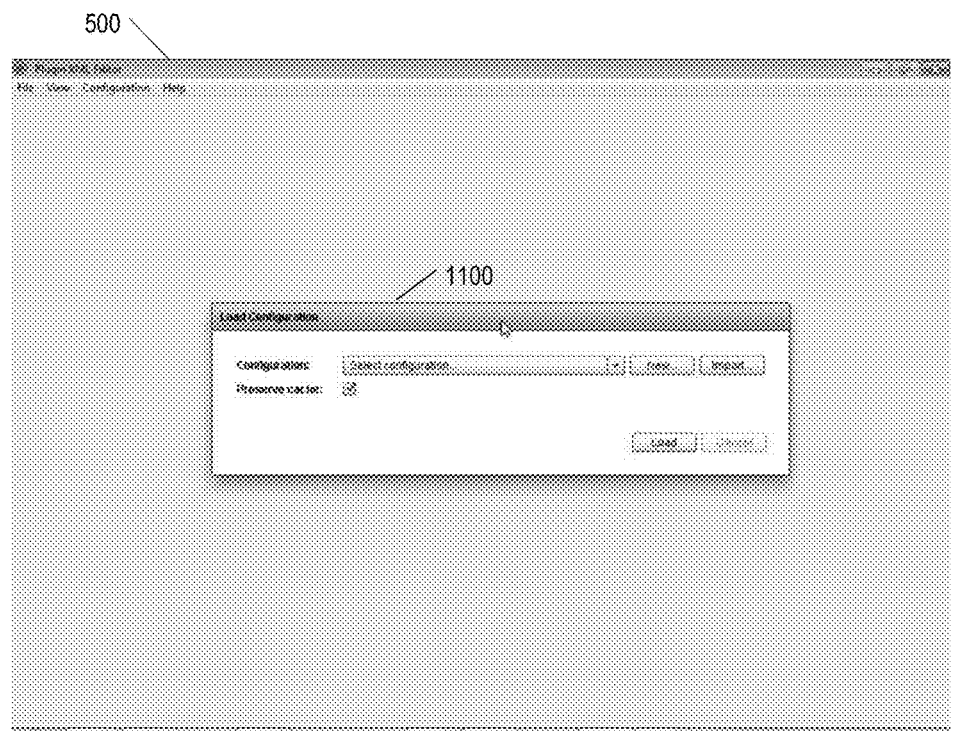
FIGS. 11 to 35 show an exemplary process for creating or editing a plug-in XML manifest file in examples of the present disclosure.

FIGS. 11 to 35 show an exemplary process for creating or editing a plug-in XML manifest file in examples of the present disclosure. FIG. 11 shows XML editor 401 (FIG. 4-1) may present a configuration dialog 1100 that allows the user to create a new configuration file 431 (FIG. 4-1) or select an existing configuration file from a list of existing configuration files, and load the selected configuration file.

Figure 12:
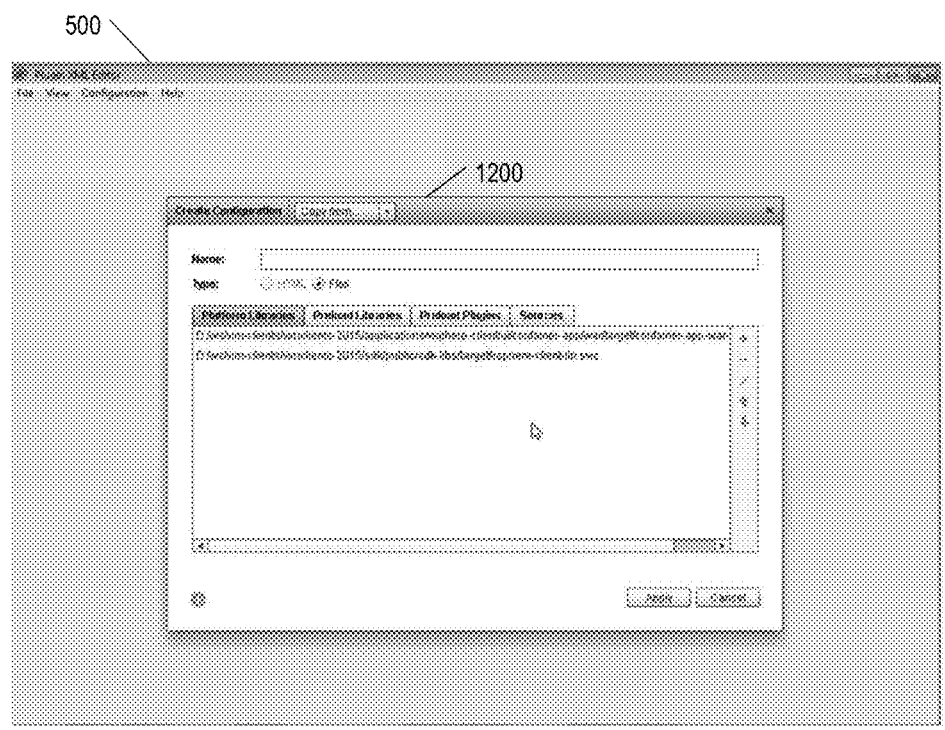

Assume the user selects to create configuration file 431. In response, FIG. 12 shows XML editor 401 presents a create configuration dialog 1200 that allows the user to name configuration file 431, select the platform type (e.g., Flex or HTML), add and remove paths to platform libraries, preload libraries, preload plug-ins, and sources included in the configuration file under their respective tabs, and apply the configuration file. Instead of creating configuration file 431 from scratch, the user may also copy and edit an existing configuration file to create the configuration file. Once the user applies the configuration file, XML editor 401 loads files 419 (FIG. 4-1) listed in configuration file 431 to collect extension properties of object types, navigation nodes, extension points, Flex classes, image and string resources (e.g., icons and labels), extension templates, template instances, namespaces, action sets, actions, action menus, and priority groups.

Figure 13:
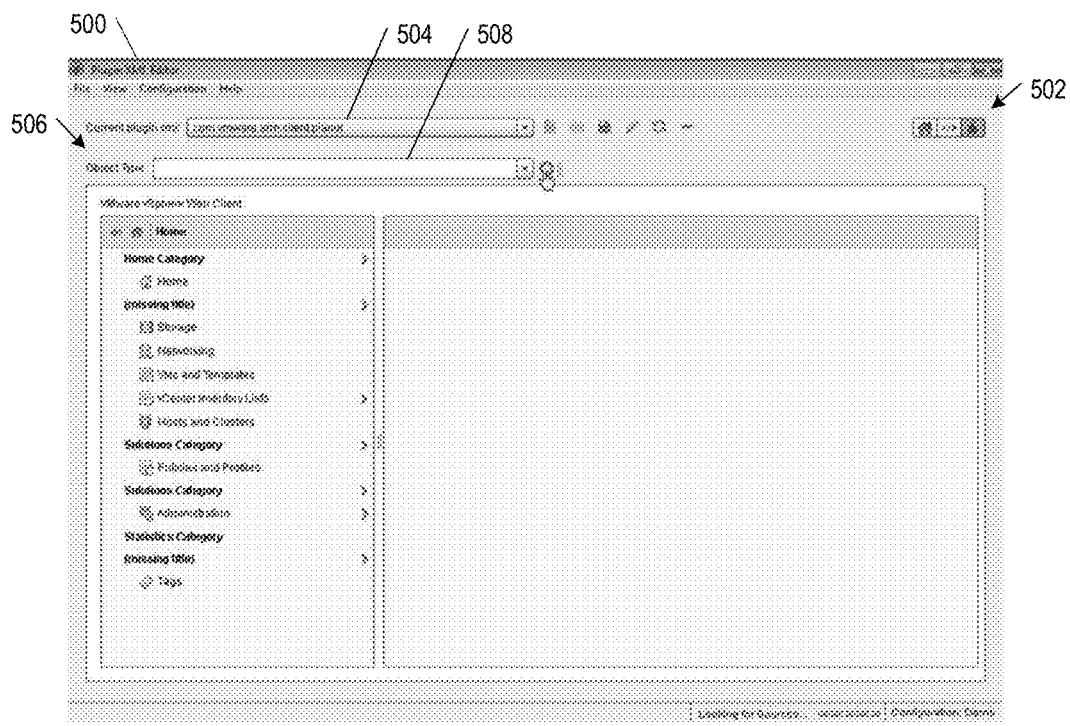

FIG. 13 shows the user has selected to edit plug-in XML file 403 in plug-in XML manifest selector 504 and the user has selected design view 506 in perspective selector 502.

Design view 506 includes object navigator editor 510 that allows the user to create or edit a navigation code, such as an object collection node to provide access to a new object type. An object collection node can be created new or from an extension template.

Design view 506 also includes object type selector 508 that allows the user to create a new object type or selecting an existing object type from a list of existing object types found in files 419, the opened plug-in XML manifest files 425 (including the current plug-in XML manifest file 403), or all of files 419 and 425.

Figure 14:
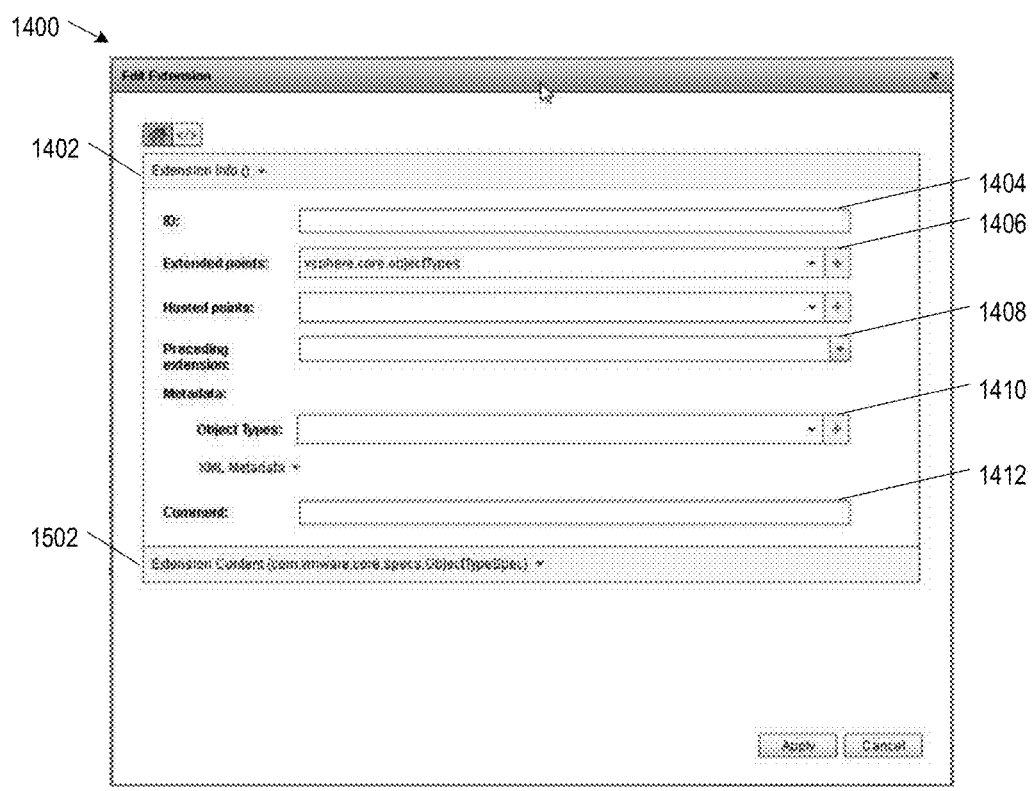

Assume the user selects to create a new object type. FIG. 14 shows XML editor 401 presents an extension dialog 1400 for editing the object type's extension properties. Extension dialog 1400 includes an extension information area 1402 and an extension content area 1502. Extension information 1402 and extension content area 1502 may be accordion GUI widgets that can extend and retract. Extension information area 1402 includes text box 1404 for editing the object type's ID (e.g., com.vmware.srm.recoveryPlan.type). Extension information area 1402 also includes editable combo box 1406 for editing the name of the object type's extension point or selecting the object type's extension point from a list of existing extension points found in files 419, the opened plug-in XML manifest files 425, and all of files 419 and 425. XML editor 401 may automatically fill editable combo box 1406 with the name of the extension point for creating new object types (e.g., vsphere.core.objectTypes).

Figure 15:
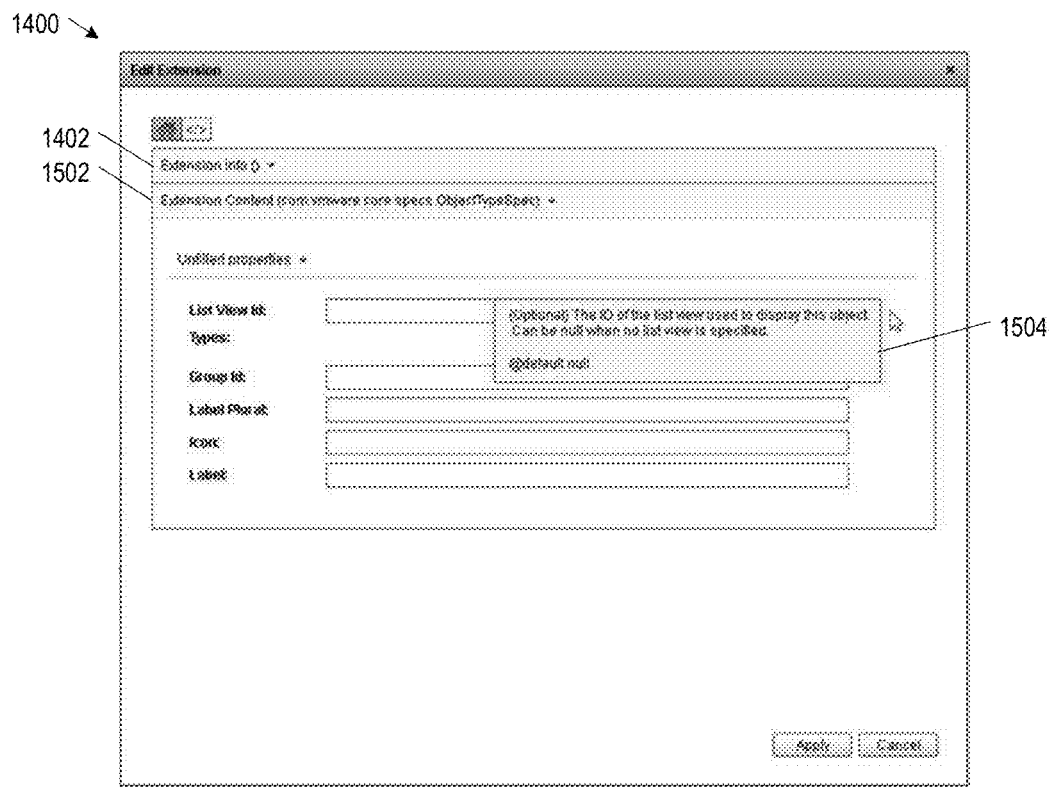

FIG. 15 shows extension content area 1502 fully extended. As can be seen, when the user hovers a cursor over a GUI widget, XML editor 401 presents a popup 1504 describing the extension property defined in that GUI widget. To generate popup 1504, XML editor 401 retrieves a comment about the extension property in the source code of the object type Flex class.

Figure 16:
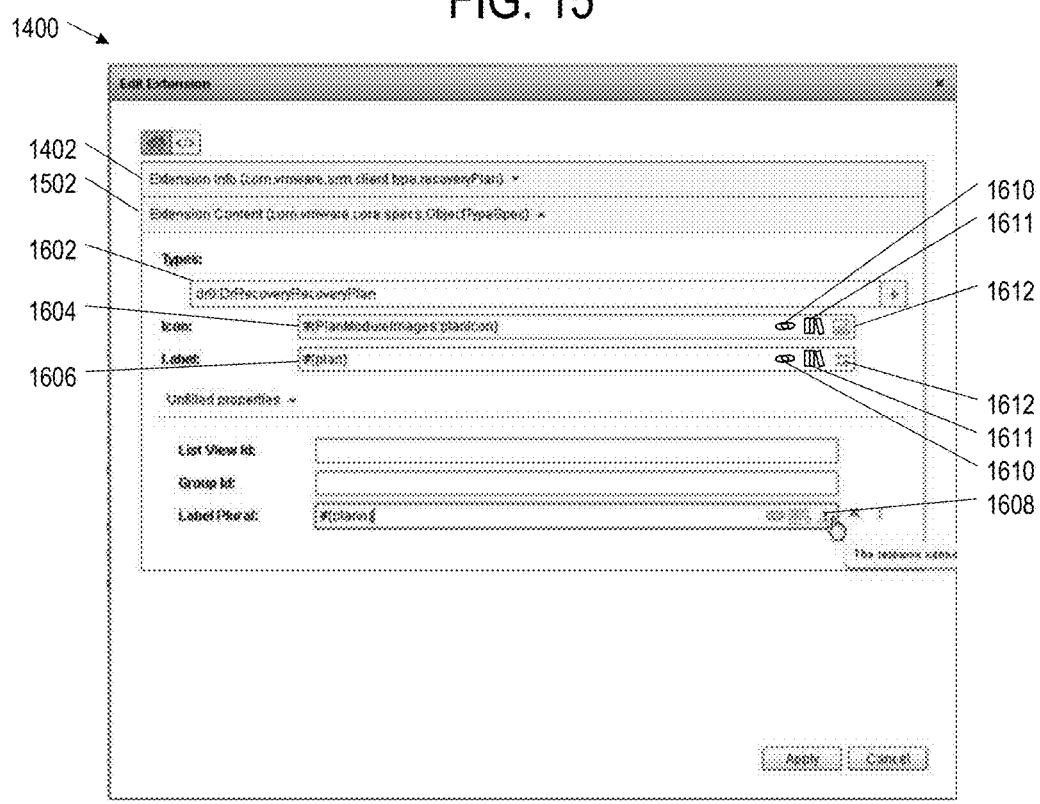

FIG. 16 shows extension content area 1502 includes editable combo boxes 1602, 1604, and 1606. Editable combo box 1602 allows the user to set the type of the object type's name (e.g., primitive or array) and the object type's name (e.g., dr0:DrRecoveryRecoveryPlan). Editable combo boxes 1604 and 1606 each allow the user to enter the resource key of the object type's icon or label into a field or select a link button 1610 to bring up a resource dialog 1700 (FIG. 17) for selecting the object type's icon or label from a list of existing icons or labels found in files 419 (e.g., resource bundles of platform libraries 421) and resource bundles specified in the opened plug-in XML manifest files 425. The field may further include a toggle button 1612 that allows the user to switch between viewing the reference's key or the reference (the icon or the label).

Figure 17:
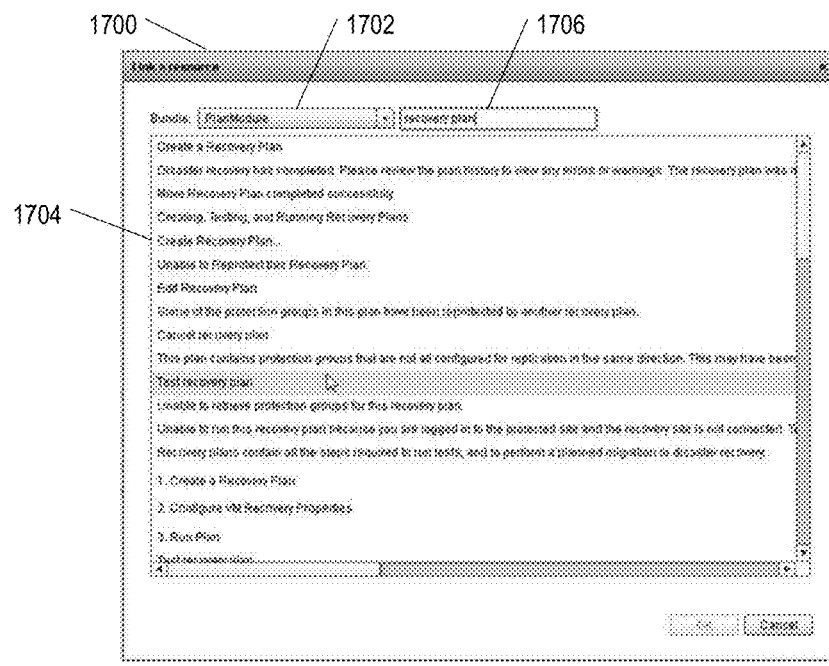

FIG. 17 shows XML editor presents a resource dialog 1700 for selecting the icon or the label. Resource dialog 1700 includes a dropdown list 1702 of loaded bundles to select a bundle of resources from a list of existing bundles found in files 419 and specified in the opened plug-in XML manifest files 425. Resource dialog 1700 displays list 1704 of icons or labels in the selected bundle of resources. Resource dialog 1700 also includes a textbox 1706 for editing a search string for filtering list 1704.

Figure 18:
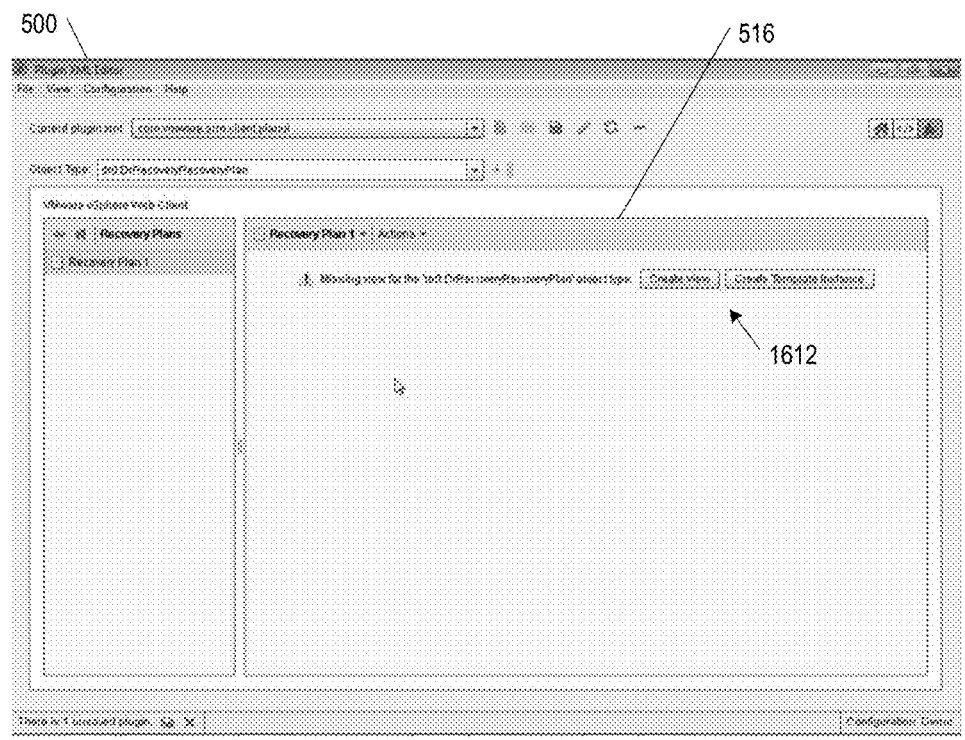

After the user creates a new object type, FIG. 18 shows XML editor 401 presents workspace editor 516 with buttons 1802 to create a new view (object workspace) or an instance of a view (object workspace) template to create an object workspace for the new object type. If the user selects to create a new view, XML editor 401 presents an extension dialog for editing the view's extension properties.

Figure 19:
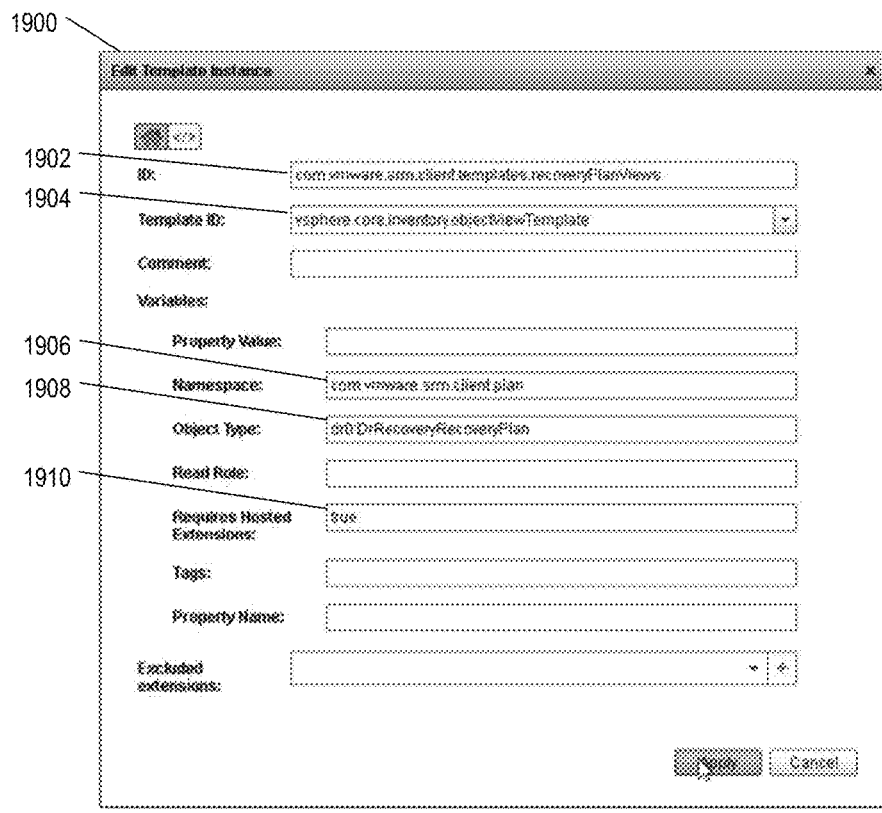

Assuming the user selects to create a view template instance, FIG. 19 shows XML editor 401 presents a template instance dialog 1900 for editing the template instance's properties. Template instance dialog 1900 includes a textbox 1902, an editable combo box 1904, a textbox 1906, a textbox 1908, and a textbox 1910. Textbox 1902 allows the user to edit the view template instance's ID. Editable combo box 1904 allows the user to select the view template by entering the view template's ID (e.g., vsphere.core.inventory.objectViewTemplate) in a field or selecting the view template's ID from a list of existing view templates found in files 419. Editable combo box 1904 may also present filtered suggestions as the user type into its field. Textbox 1906 allows the user to enter the view template instance's namespace. Textbox 1908 allows the user to enter the ID of the view template instance's object type. XML editor 401 may automatically fill textbox 1908 with the ID of the view template instance's object type (previously provided in editable combo box 1602 in FIG. 16). Textbox 1910 allows the user to enter if hosted extensions are required (true or false). XML editor 401 may automatically fill textbox 1910 to require hosted extensions for some templates (e.g., vsphere.core.inventory.objectViewTemplate).

Once the user applies the extension properties of the template instance, FIG. 20 shows XML editor 401 saves the view template instance as a master view for the new object type and generates an object workspace 2002 in workspace editor 516. Workspace editor 516 includes object representation menu 512 and tab menu 2004. Object representation menu 512 allows the user to edit object representations (icons and labels) for the object type. The top half of object representation menu 512 allows the user to edit an object representation for the object type through an extension dialog and to revert changes to the object representation. The bottom half of object representation menu 512 allows the user to add additional icons and labels and set conditions under which they are displayed. Tab menu 2004 allows the user to create a new first-level tab or selecting an existing first-level tab from a list of first-level tabs in the view template instance and create a first-level tab data view, a portlet, or a second-level tab under the selected first-level tab.

Figure 21:
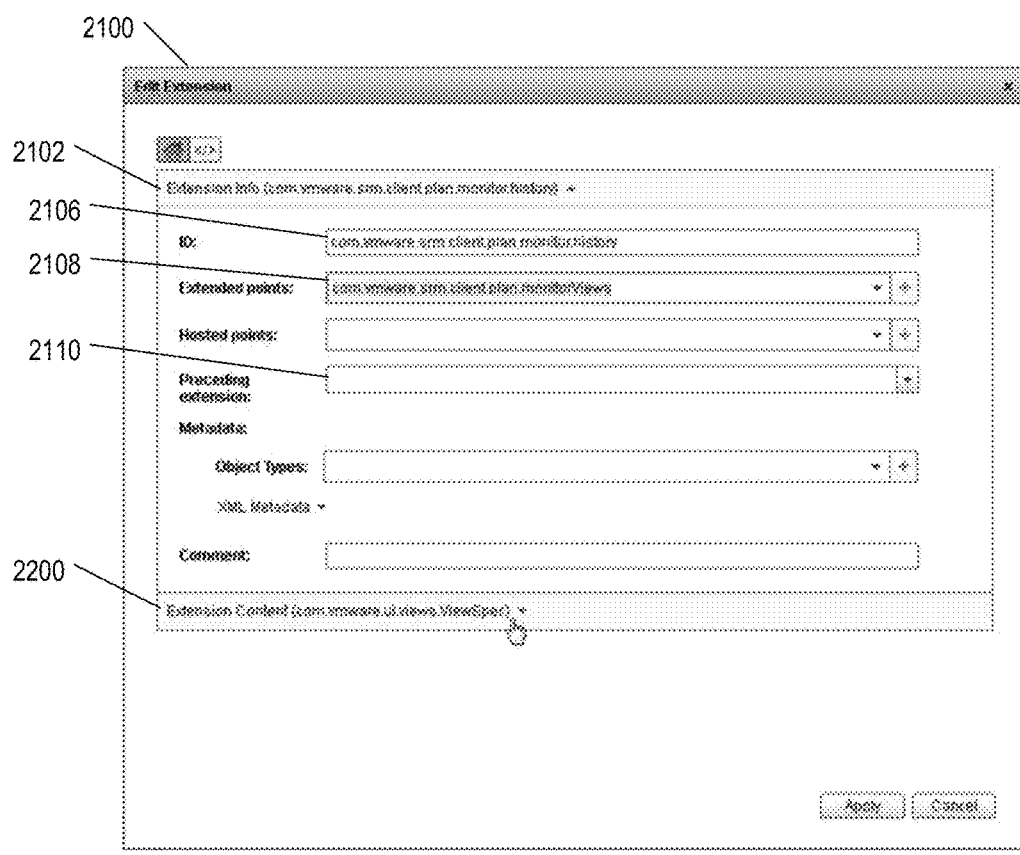

Assuming the user selects an existing first-level tab (e.g., monitor tab), FIG. 21 shows XML editor 401 presents an extension dialog 2100 for creating a first-level tab data view, a portlet, or a second-level tab under the selected first-level tab. Assume the user wishes to create a second-level tab. Extension dialog 2100 includes an extension information area 2102 and an extension content area 2200 (shown retracted). Extension information area 2102 and extension content area 2200 may be accordion GUI widgets that can extend and retract. Extension information area 2102 includes a textbox 2106, an editable combo box 2108, and an editable combo box 2110. Textbox 2106 allows the user to edit the second-level tab extension's ID. Editable combo box 2108 allows the user to enter the name of the second-level tab extension's extension point in a field or select the extension's extension point from a list of existing extension points found in files 419, the opened plug-in XML manifest files 425, or all of files 419 and 425. Editable combo box 2108 may present filtered suggestions as the user type into its field. XML editor 401 may automatically fill editable combo box 2108 with the extension point to the selected first-level tab (e.g., ${namespace}.monitorViews). Editable combo box 2110 allows the user to edit the ID of the second-level tab extension's preceding extension. When another second-level tab extension precedes the second-level tab extension, XML editor 401 may automatically fill editable combo box 2110 with the ID of the other second-level tab extension.

Figure 22:
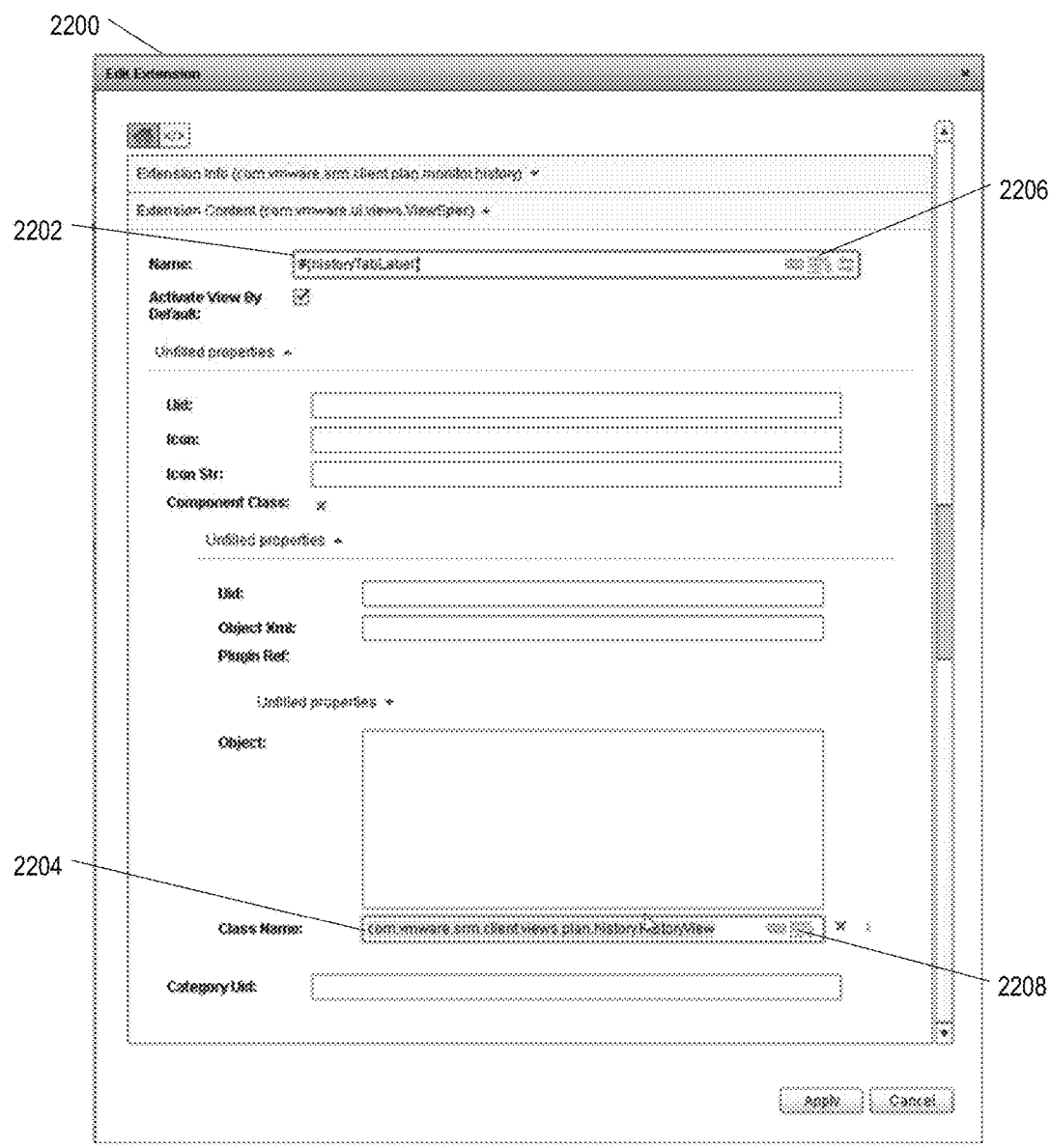

FIG. 22 shows extension content area 2200 fully extended. Extension content area 2200 includes editable combo boxes 2202 and 2204. Editable combo box 2202 allows the user to edit the resource key of the second-level tab extension's label in a field or select a link resource button 2206 to bring up a resource dialog 1700 (FIG. 17) for selecting the second-level tab extension's label from a list of existing labels found in files 419 (e.g., resource bundles of platform libraries 421) and resource bundles specified in the opened plug-in XML manifest files 425. Editable combo box 2204 allows the user to enter the name of the second-level tab extension's Flex (component) class in a field or select an insert class button 2208 to bring up a class dialog 2300 (FIG. 23) for selecting the second-level tab extension's component class from a list of existing Flex classes found in files 419 (e.g., SWF files of platform libraries 421) and SWF files specified in the opened plug-in XML manifest files 425. Note that component class refers to an object type from which an instance is created to be displayed as a data view.

Figure 23:
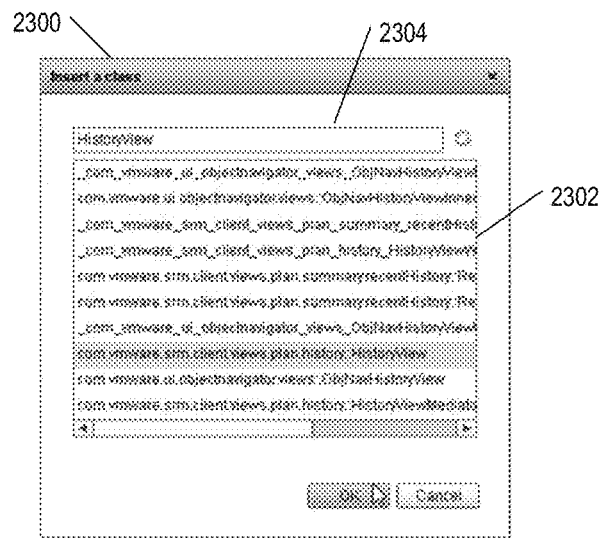

FIG. 23 shows a class dialog 2300 for selecting the second-level tab extension's component class from a list 2302 of existing Flex classes from files 419 (e.g., SWF files of platform libraries 421) and SWF files specified in the opened plug-in XML manifest files 425. Class dialog 2300 also includes a search string textbox 2304 for filtering list 2302.

In response to user edits, XML editor 401 validates the second-level tab extension's ID, the resource key of the second-level tab extension's label, and the name of the second-level tab extension's component class.

FIG. 24 shows object workspace 2002 after the user created second-level tabs 2404 and 2406 under first-level tab 2408 using the process described above. Object workspace 2002 is a drag-and-drop interface where second-level tabs 2402 and 2406 are movable relative to each other under first-level tab 2408 and movable to another first-level tab to change the layout of the object workspace. In response to user input moving second-level tabs 2404 and 2406, XML editor 401 may update their extension points and their preceding extensions in the XML code. For example, in response to user input moving second-level tab 2404 behind second-level tab 2406, XML editor 401 updates their preceding extensions to reflect this change in the XML code. This can be seen in FIG. 25, where the ID of the extension's preceding extension in editable combo box 2110 has been changed to reflect the change.

Figure 26:
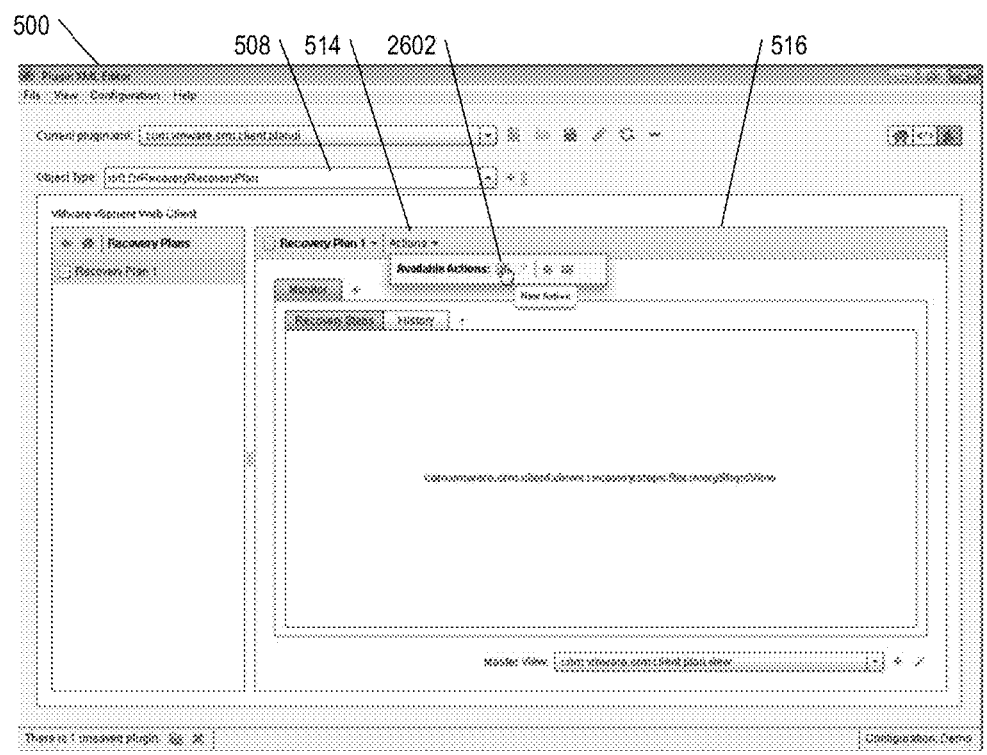
Figure 27:
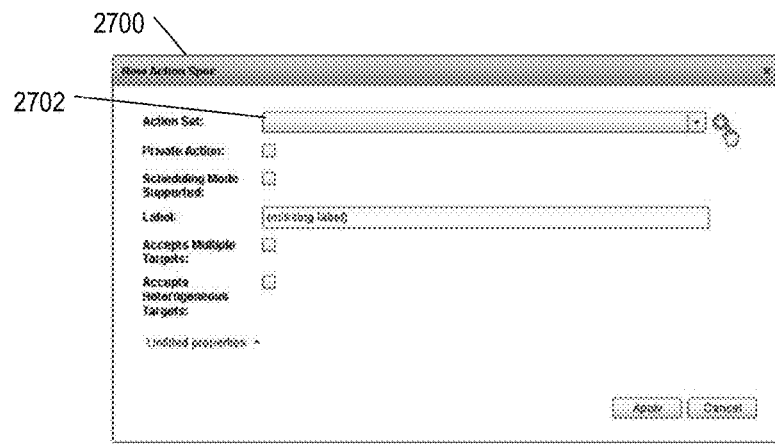

FIG. 26 shows workspace editor 516 includes action-related menu 514 for creating, editing, or deleting an action or an action menu for the selected object type. Assuming the user selects to create a new action by selecting a button 2602 in action-related menu 514, FIG. 27 shows XML editor 401 presents a new action spec dialog 2700 for editing the action's properties. New action spec dialog 2700 includes an editable combo box 2702 for creating a new action set or selecting an existing action set from a list of existing action sets. The user creates or selects an action set because every action is grouped into an action set, and each action set is associated with an object type.

Figure 28:
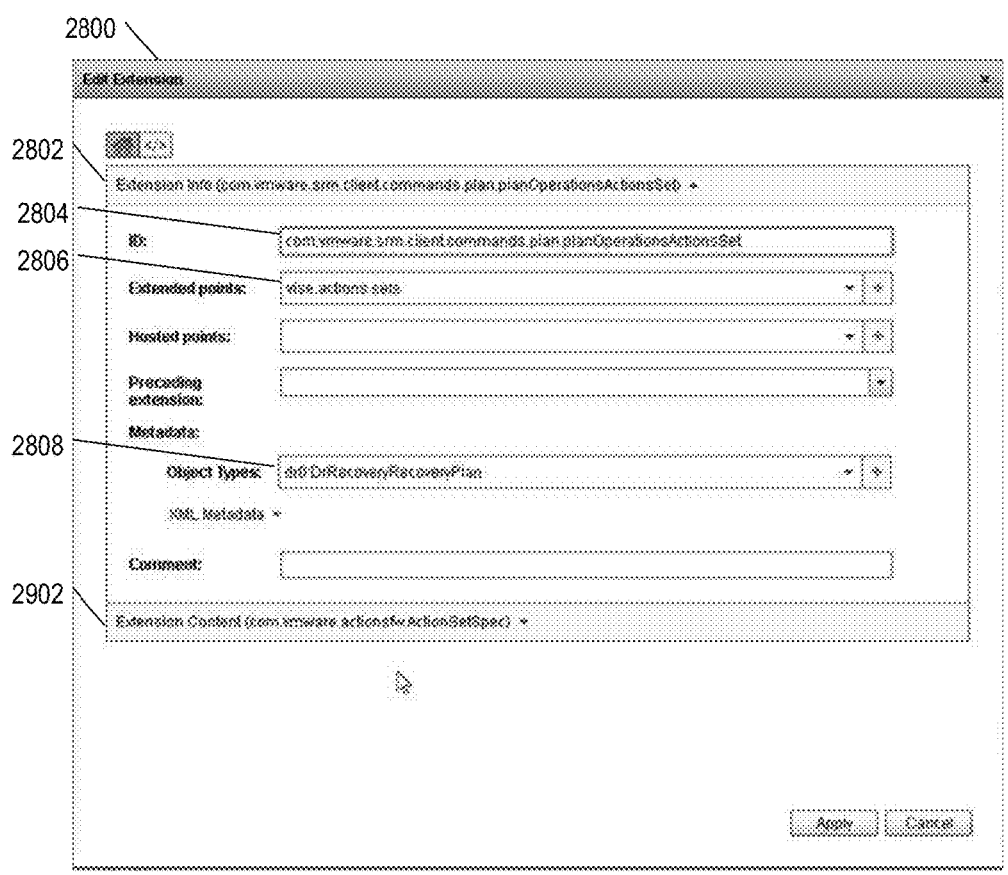

Assuming the user selects to create a new action set, FIG. 28 shows XML editor presents an edit extension dialog 2800 for editing the action set's extension properties. Extension dialog 2800 includes extension information area 2802 and an extension content area 2902 (shown retracted). Extension information area 2802 and extension content area 2902 may be accordion GUI widgets that can extend and retract. Extension information area 2802 includes a textbox 2804, an editable combo box 2806, and an editable combo box 2808. Textbox 2804 allows the user to edit the action set's ID. Editable combo box 2806 allows the user to edit the name of the action set's extension point or select the action set's extension point from a list of existing extension points found in files 419, the opened plug-in XML manifest files 425 (including the current plug-in XML manifest file 403), or all of files 419 and 425. XML editor 401 may automatically fill editable box 2806 with the name of the extension point for creating new action sets (vice.action.set).

Editable combo box 2808 allows the user to select an object type as a filtering metadata by entering the object type's ID in a field or select the object type from a dropdown list of existing object types found in files 419, the opened plug-in XML manifest files 425, or all of files 419 and 425. XML editor 401 may automatically fill editable combo box 2808 with the name of the object type (dr0:DrRecoveryRecoveryPlan) currently selected in object type selector 508 (FIG. 26).

In response to user edits, XML editor 401 validates the action set's ID, the name of the action set's extension point, and the ID of the action set's filtering metadata object type.

Figure 29:
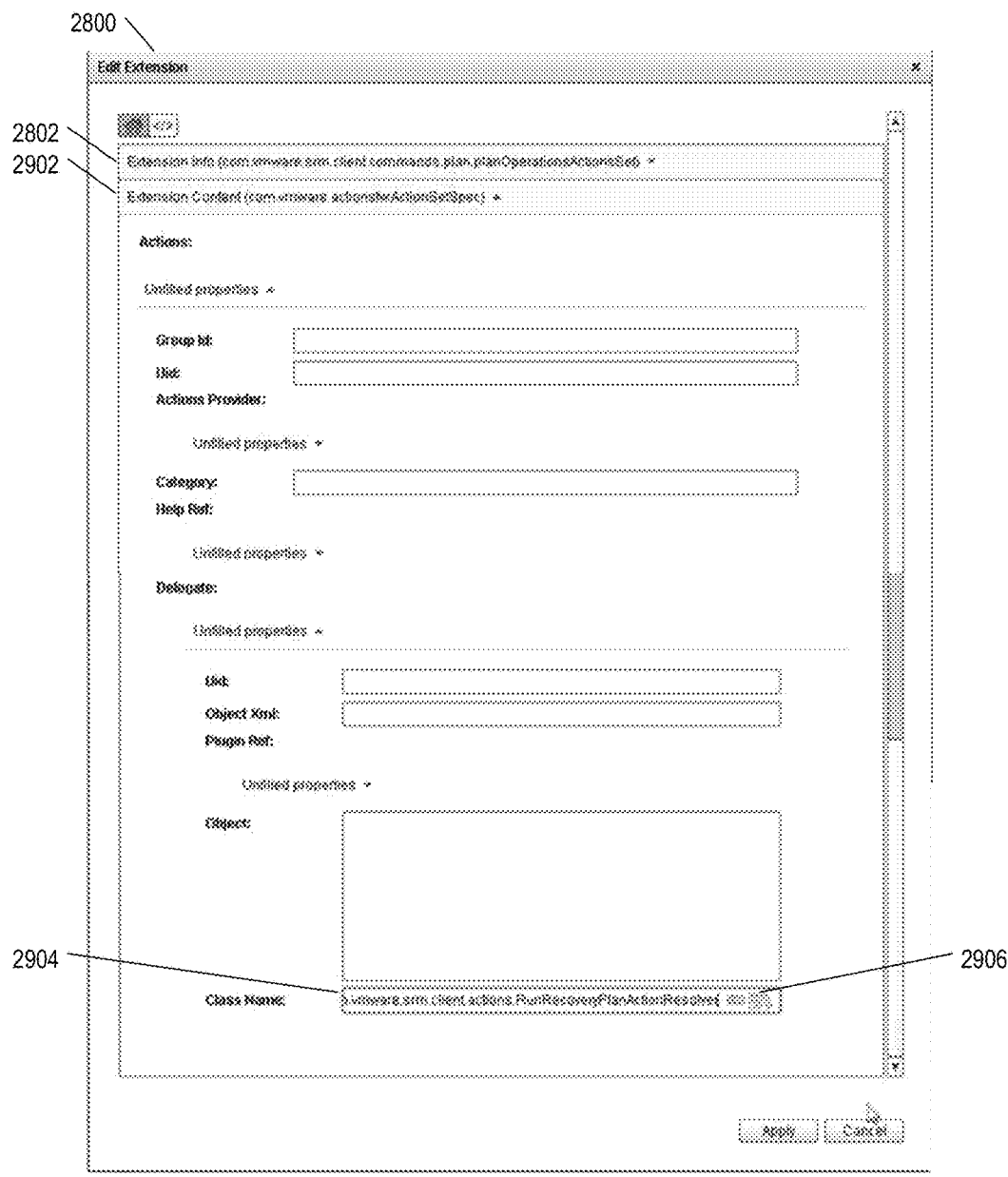

FIG. 29 shows extension content area 2902 fully extended. Extension content area 2902 includes an editable combo box 2904 for editing the name of the action set's Flex (command) class or selecting an insert class button 2906 to bring up a dialog for selecting the command class from a list of existing Flex classes found in files 419 (e.g., SWF files of platform libraries 421) and SWF files specified in the opened plug-in XML manifest files 425. Note that command class refers to a Flex class created for an action. In response to user edits, XML editor 401 validates the name of the action set's command class.

Figure 30:
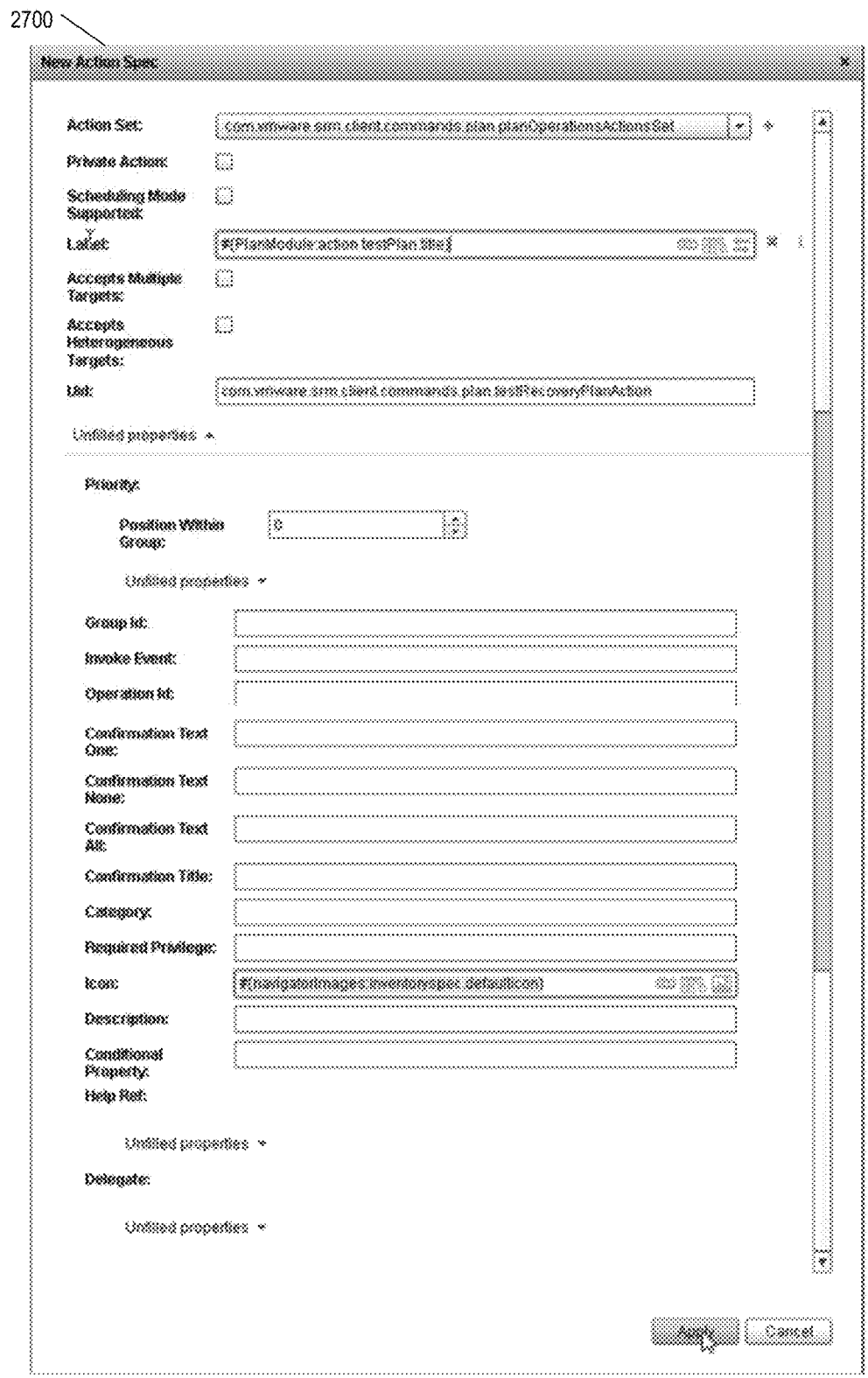

Assuming the user has created an action set, FIG. 30 shows XML editor 401 again presents new action spec dialog 2700, which is now ready to create a new action under the newly created action set selected in editable combo box 2702. New action spec dialog 2700 includes an editable combo box 3002, a textbox 3004, an editable combo box 3006, and a textbox 3008. Editable combo box 3002 allows the user to enter the resource key of the action's label or select the action's label from a list of existing tab labels found in files 419 (e.g., resource bundles of platform libraries 421) and resource bundles specified in the opened plug-in XML manifest files 425. Textbox 3004 allows the user to edit the action's ID. Editable combo box 3006 allows the user to enter the resource key of the action's icon or select the action's icon from a list of existing icons found in files 419 (e.g., resource bundles of platform libraries 421) and resource bundles specified in the opened plug-in XML manifest files 425. As previously described regarding FIG. 17, XML editor 401 presents a resource dialog with a dropdown list of bundles for selecting a bundle of resources and a search string textbox for filtering a list of resources in the bundle. In response to user edits, XML editor 401 validates the action's ID, the resource key for the action's label, and the resource key of the action's icon. Textbox 3008 allows the user to edit the action's group ID. Actions having the same group ID are located together under a group icon in action-related menu 514.

Figure 31:
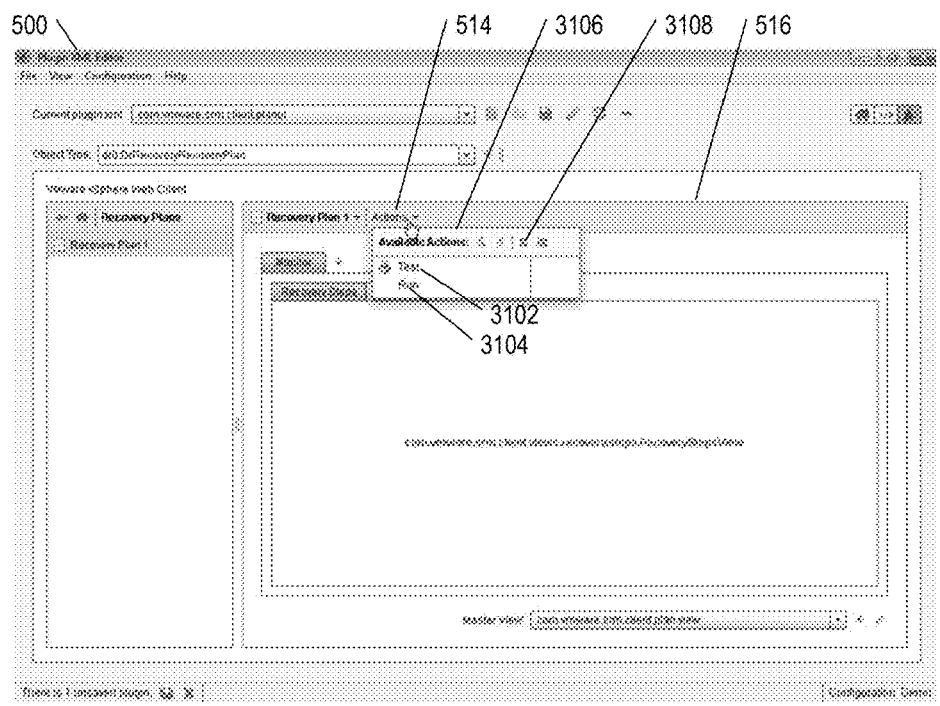
Figure 32:
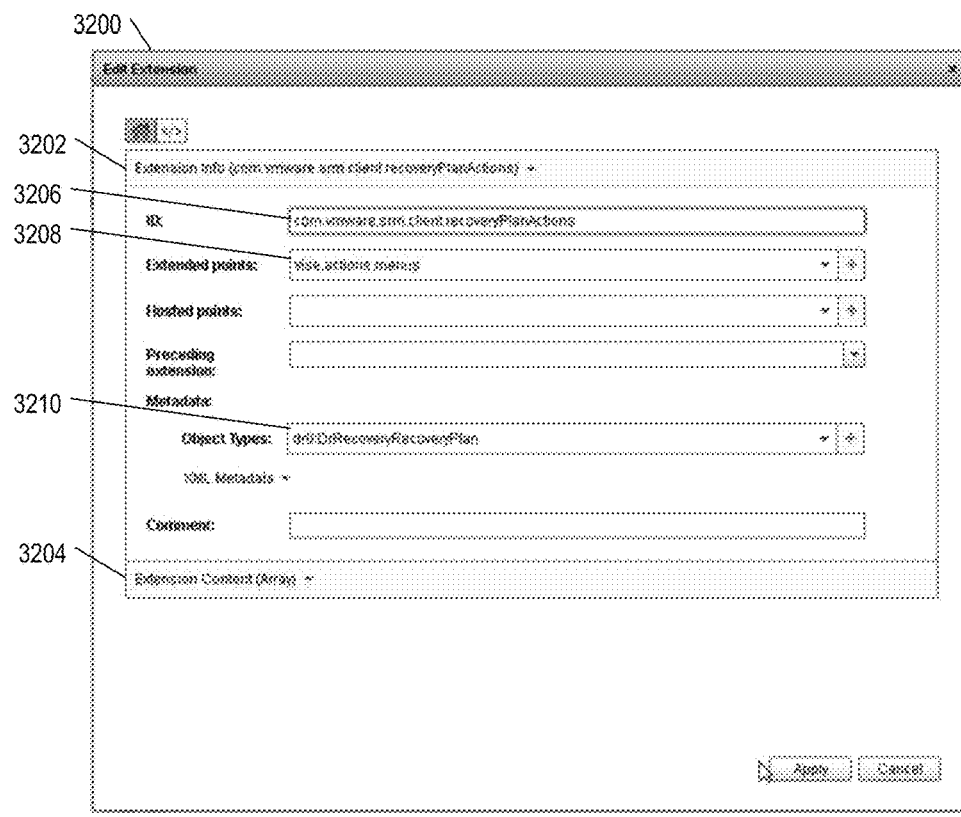

FIG. 31 shows workspace editor 516 after the user created actions 3102 and 3104 under action set 3106 in action-related menu 514 using the process described above. Action-related menu 514 includes new action menu button 3108 and new priority group button 3110. Assuming the user selects to create a new action menu by selecting new action menu button 3108, FIG. 32 shows XML editor 401 presents an edit extension dialog 3200 for editing the action menu's properties. Edit extension dialog 3200 includes an extension information area 3202 and an extension content area 3204. Extension information area 3202 includes a textbox 3206, an editable combo box 3208, and editable combo box 3210. Textbox 3206 allows the user to edit the action menu's ID. Editable combo box 3208 allows the user to enter the name of the action menu's extension point or select the action menu's extension point from a list of existing extension points found in files 419, the opened plug-in XML manifest files 425 (including the current plug-in XML manifest file 403), or all of files 419 and 425. XML editor 401 may automatically fill editable combo box 3208 with the name of the extension point for creating new action menus (vise.actions.menu).

Editable combo box 3210 allows the user to select an object type as a filtering metadata by entering the object type's ID in a field or select the object type from a dropdown list of existing object types found in files 419, the opened plug-in XML manifest files 425, or all of files 419 and 425. XML editor 401 may automatically fill editable combo box 3210 with the name of the object type (dr0:DrRecoveryRecoveryPlan) currently selected in object type selector 508 (FIG. 26).

In response to the user edits, XML editor 401 validates the action menu's ID, the name of the action menu's extension point, and ID of the action menu's filtering metadata object type.

Figure 33:
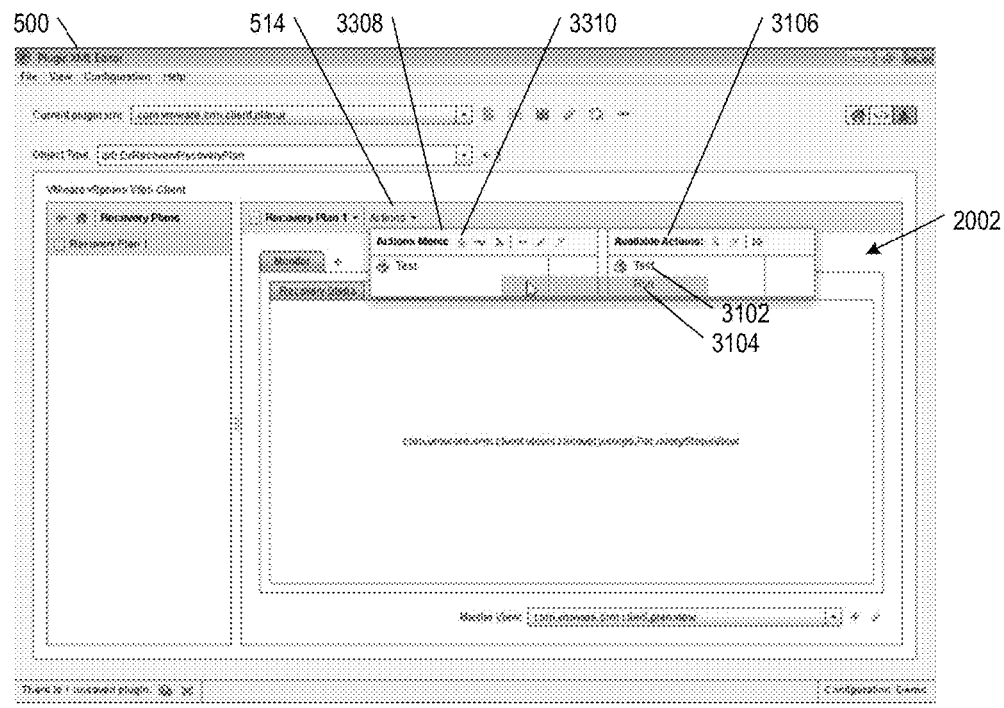

FIG. 33 shows object workspace 2002 includes action set 3106 with actions 3102 and 3104. Object workspace 2002 also includes the newly created action menu 3308 that allows the user to create actions and sub-menus, and to remove, edit, or revert changes to actions in the action menu. Object workspace 2002 is a drag-and-drop interface where actions 3102 and 3104 can be moved from action set 3106 to action menu 3308 to add them to the action menu. In response to user input moving action 3102 and 3104, XML editor 401 updates their group IDs with the action menu's ID to reflect this change in the XML code.

Figure 34:
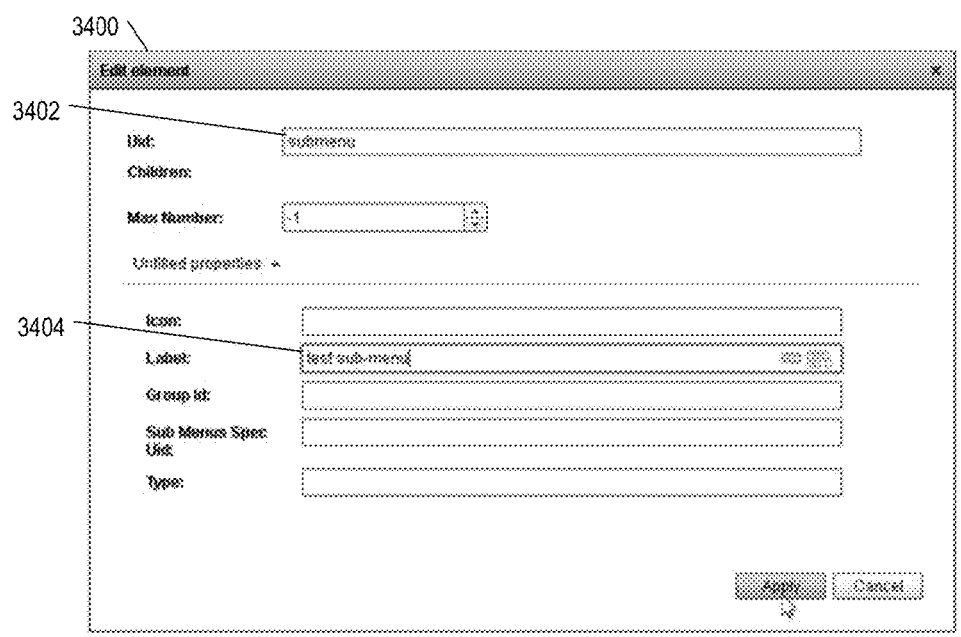

Assuming the user selects to create a new sub-menu by selecting a button 3310 in action menu 3308, FIG. 34 shows XML editor 401 presents an edit element dialog 3400 for editing the sub-menu's extension properties. Edit element dialog 3400 includes a textbox 3402 and an editable combo box 3404. Textbox 3402 allows the user to enter the sub-menu's ID. Editable combo box 3404 allows the user to edit a resource key of the sub-menu's label or select the sub-menu's label from a list of existing labels found in files 419 (e.g., resource bundles of platform libraries 421) and resource bundles specified in the opened plug-in XML manifest files 425. As previously described regarding FIG. 17, XML editor 401 presents a resource dialog with a dropdown list of bundles for selecting a bundle of resources and a search string textbox for filtering a list of resources in the bundle. In response to user edits, XML editor 401 validates the sub-menu's ID and the resource key of the sub-menu's label.

FIG. 35 shows object workspace 2002 after the user created a sub-menu 3508 (shown retracted) in action menu 3308. The user clicks sub-menu 3508 to expand the sub-menu. Like action menu 3308, actions 3102 and 3104 in action set 3106 are movable to sub-menu 3508 to add them to the sub-menu. In response to user input moving actions 3102 and 3104, XML editor 401 updates their group IDs with the action menu's ID to reflect this change in the XML code. Note that a priority group is created in a similar manner as an action menu, by dragging and dropping available actions in action menu 3308 into the priority group.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for a XML editor to edit a current plug-in XML manifest file that extends a browser user interface for objects in a virtual environment, the method comprising:
   loading one or more files including one or more platform libraries and one or more reload plug-in XML, manifest files, said loading including extracting extension properties from the one or more files;
   opening one or more plug-in XML manifest files including the current plug-in XML manifest file, said opening including extracting additional extension properties from the one or more plug-in XML manifest files;
   presenting a graphical user interface (GUI) for editing the current plug-in XML manifest file;
   receiving one or more user edits to the current plug-in XML manifest file through the GUI;
   validating the one or more user edits against the extension properties, the additional extension properties, or all of the extension properties and the additional extension properties, said validating including generating a warning in the GUI for a user edit that conflicts with an extension property from the one or more files or the one or more plug-in XML manifest files;
   visualizing one or more changes to the browser user interface caused by the one or more user edits;
   generating or updating XML code in the current plug-in XML manifest file in response to the one or more user edits; and
   saving the XML code,
   wherein the one or more files include source files of classes, the source files including comments; and
   wherein presenting the GUI further includes:
      extracting the comments for the classes from the one or more source files; and
      displaying the comments along with GUI elements for editing properties of the one or more elements.

2. A method for a XML editor to edit a current plug-in XML manifest file that extends a browser user interface for objects in a virtual environment, the method comprising:
   loading one or more files including one or more platform libraries and one or more reload plug-in XML manifest files, said loading including extracting extension properties from the one or more files;
   opening one or more plug-in XML manifest files including the current plug-in XML manifest file, said opening including extracting additional extension properties from the one or more plug-in XML manifest files;
   presenting a graphical user interface (GUI) for editing the current plug-in XML manifest file;
   receiving one or more user edits to the current plug-in XML manifest file through the GUI;
   validating the one or more user edits against the extension properties, the additional extension properties, or all of the extension properties and the additional extension properties, said validating including generating a warning in the GUI for a user edit that conflicts with an extension property from the one or more files or the one or more plug-in XML, manifest files;
   visualizing one or more changes to the browser user interface caused by the one or more user edits;
   generating or updating XML code in the current plug-in XML manifest file in response to the one or more user edits; and
   saving the XML code, wherein:
   extracting extension properties from the one or more files and extracting additional properties from the one or more plug-in XML manifest files comprise extracting object types and navigation nodes;
   presenting the GUI includes:
      presenting a first view comprising:
         an object type selector for creating an object type or selecting the object type from a list of the object types found in the one or more files and the one more plug-in XML manifest files;
         an object navigator editor for creating a navigation node or selecting the navigation node from a list of the navigation nodes found in the one or more files and the one or more plug-in XML manifest files;
         a first menu for editing one or more object representations for the object type;
         a second menu for editing one or more action-related functionalities for the object type; and
         a workspace editor for editing a workspace for the object type for creating one or more data views for the object type, the workspace editor comprising a drag-and-drop interface where the one or more data views and the one or more action-related functionalities are movable to edit their arrangement in the workspace.

3. The method of claim 2, wherein:
   the navigation node comprises an object collection node, a category, or a pointer node;
   an object representation comprises an image resource or a string resource;

a data view comprises a first-level tab, a first-level tab data view, a second-level tab, a second-level tab data view, or a portlet; and an action-related functionality comprises an action set, an action, an action menu, an action sub-menu, or a priority group.

4. The method of claim 2, wherein:

one or more resource bundles are included in the one or more files and identified by the one or more plug-in XML manifest files;

extracting extension properties from the one or more files and extracting additional properties from the one or more plug-in XML, manifest files comprise extracting extension points or resources and their resource keys, the resources including icons and labels;

presenting the first view includes:
  presenting an extension dialog for editing an extension's properties, the extension dialog comprising:
    an extension information area, comprising:
      a first GUI widget for editing an extension's ID for the extension; or
      a second GUI widget for editing a name of the extension's extension point or selecting the extension's extension point from a list of the extension points;
    an extension content area, comprising:
      a third GUI widget for editing another extension's ID as filtering metadata or selecting the other extension from a list of the extensions; or
      a fourth GUI widget for editing a resource key of the extension's resource or selecting the extension's resource from a list of the resources; and validating the one or more user edits includes validating the extension's ID, the name of the extension's extension point, the object type's ID, or the resource key of the extension's resource against the extension properties, the additional extension properties, or all of the extension properties and the additional extension properties.

5. The method of claim 4, wherein:

extracting the extension properties from the one or more files and extracting additional properties from the one or more plug-in XML manifest files comprise extracting namespaces or class names;

the extension content area further comprising:
  a fifth GUI widget for editing the extension's namespace; or
  a sixth GUI widget for editing a name of the extension's class or selecting the name of the extension's class from a list of the classes; and validating the one or more user edits includes validating the extension's namespace or the name of the extension's component class against the extension properties, the additional extension properties from the plug-in XML, manifest file, or all of the extension properties and the additional extension properties.

6. The method of claim 5, wherein the first and the third GUI widgets are text boxes, and the second, the fourth, the fifth, and the sixth GUI widgets are editable combo boxes.

7. The method of claim 2, wherein presenting the GUI further includes:

presenting a second view comprising:
  an inspector panel, comprising:
    tabs for selecting a XML element type from an extension element type, an extension point element type, an extension template element type, and an extension template instance element type;
    an element list of XML elements from the current plug-in XML manifest file that are the XML element type, the extension list being for selecting, adding, and removing a XML element; and
    an inspection area for viewing the XML element, the inspection area being switchable between a summary view of the XML element's properties and a XML view of the XML element's XML snippet; and
  a validation panel comprising a list of problematic XML elements for selecting a problematic XML element, the problematic XML elements being determined from validating the one or more user edits; and in response to user input selecting a problematic XML element, updating the inspector panel to:
  select one of the tabs with the corresponding XML element type;
  select the problematic XML element in the extension list of XML elements; and
  display the summary view or the XML view of the problematic XML element in the inspection area.

8. The method of claim 7, wherein:

extracting extension properties from the one or more files further and extracting additional extension properties from the one or more plug-in XML manifest files comprise extracting extension points and classes;

presenting the second view further comprises:
  in response to user input to create the extension or the template instance, presenting an extension dialog comprising:
    a first sub-view including:
      an extension information area, comprising:
        a first GUI widget for editing the extension's ID; or
        a second GUI widget for editing a name of the extension's extension point or selecting the extension's extension point from a list of the extension points found in the one or more files and the plug-in XML manifest file;
      an extension content area, comprising:
        a third GUI widget for editing the extension's name;
        a fourth GUI widget for editing a resource key of the extension's resource or selecting the extension's resource from a list of the resources; or
        a fifth GUI widget for editing the extension's namespace;
        a sixth GUI widget for editing an ID of an object type as filtering metadata for the extension or selecting the object type from a list of the object types; or
        a seventh fifth GUI widget for editing a name of the extension's class or selecting the extension's class from a list of the component classes; and
    a second sub-view comprising coding area for editing or pasting the extension's XML, snippet;

validating the one or more user edits includes validating the extension's ID, the name of the extension's extension point, the extension's name, the resource key of the extension's resource, the extension's namespace, the ID of the extension's object type, or the name of the extension's class against the extension properties and the additional extension properties.

9. The method of claim 7, wherein:
the inspector panel further comprises a filter GUI menu for selecting an extension type or a property search string; and
presenting the second view further comprises, in response to user input to select the extension type or the property search string, filtering the list of XML elements for the type or the property.

10. The method of claim 7, wherein presenting the GUI further includes, in response to use input to delete the XML element:
marking the XML element for deletion;
determining one or more XML elements that reference the XML element; and
presenting a warning window identifying the one or more XML elements that allows selection of any of the one or more XML elements to delete their references to the XML element.

11. The method of claim 7, wherein:
presenting the GUI further includes presenting a third view comprising the XML code in the plug-in XML manifest file; and
unchanged, removed, and added portions of the XML code are displayed in different colors.

12. The method of claim 11, wherein presenting the GUI further includes:
presenting another selector for creating, selecting, saving, editing, refreshing, and deleting the current plug-in XML manifest file; and
presenting a perspective selector for switching between the first, the second, and the third views.

13. A method for a XML editor to edit a current plug-in XML manifest file that extends a browser user interface for objects in a virtual environment, the method comprising:
loading one or more files including one or more platform libraries and one or more reload plug-in XML, manifest files, said loading including extracting extension properties from the one or more files;
opening one or more plug-in XML manifest files including the current plug-in XML manifest file, said opening including extracting additional extension properties from the one or more plug-in XML manifest files;
presenting a graphical user interface (GUI) for editing the current plug-in XML manifest file;
receiving one or more user edits to the current plug-in XML manifest file through the GUI;
validating the one or more user edits against the extension properties, the additional extension properties, or all of the extension properties and the additional extension properties, said validating including generating a warning in the GUI for a user edit that conflicts with an extension property from the one or more files or the one or more plug-in XML manifest files;
visualizing one or more changes to the browser user interface caused by the one or more user edits;
generating or updating XML code in the current plug-in XML manifest file in response to the one or more user edits; and
saving the XML code, wherein:
extracting extension properties from the one or more files and extracting additional properties from the one or more plug-in XML manifest files comprise extracting object types, extension points, icons, icon resource keys, labels, and label resource keys;
presenting the GUI includes:
presenting an object type selector for creating an object type or selecting the object type from a list of the object types;
in response to receiving user input to create the object type, presenting an extension dialog for editing the object type's properties, the extension dialog comprising:
an extension information area, comprising:
a text box for editing the object type's ID; and
an editable name combo box for editing the object type's name; and
an extension content area, comprising:
an editable extension point combo box automatically filled with a name of the object type's extension point; and
an editable icon combo box for editing an icon resource key of the object type's icon or selecting the object type's icon from a list of the icons;
an editable label combo box for editing a label resource key of the object type's label or selecting the object type's label from a list of the labels; and
validating the one or more user edits includes validating the object type's ID, the icon resource key, or the label resource key against the extension properties and the additional extension properties.

14. The method of claim 13, wherein:
extracting extension properties from the one or more files and extracting additional properties from the one or more plug-in XML, manifest files further comprise extracting view templates;
presenting the GUI includes:
presenting a GUI widget for creating a view or a view template instance for the object type;
in response to receiving user input to create the view template instance for the object type, presenting a template instance dialog for editing the view template instance's properties, the template instance dialog comprising:
a template instance dialog, comprising:
a text box for editing the view template instance's ID; and
an editable template ID combo box for editing a view template's ID or selecting the view template from a list of the view templates;
a namespace textbox for editing the view template instance's namespace; and
a textbox automatically filled with the object type's ID; and
validating the one or more user edits includes validating the view template instance's ID, the view template's ID, the view template instance's namespace, or the object type's ID against the extension properties and the additional extension properties.

15. The method of claim 14, wherein:
extracting extension properties and extracting additional properties from the one or more plug-in XML, manifest files further comprise extracting labels and classes;
presenting the GUI further includes:
presenting a tab menu to create a first-level tab or selecting the first-level tab from a list of first-level tabs in the template instance;
in response to user input selecting the first-level tab, presenting an extension dialog for editing a second-level tab's properties, the second-level tab being under the first-level tab, the extension dialog comprising:
an extension information area, comprising:
a text box for editing the second-level tab's ID;
an editable extension point combo box automatically filled with a name of the second-level tab's extension point; and
an editable preceding extension combo box automatically filled another second-level tab's ID when the other second-level tab precedes the second-level tab under the first-level tab;
an extension content area, comprising:
an editable label combo box for editing a resource key of the second-level tab's label or selecting the second-level tab's label from a list of the labels; and
an editable component class combo box for editing a name of the second-level tab's class or selecting the second-level tab's class from a list of the classes;
presenting a workspace editor for editing the workspace including the first-level tab and the second-level tab under the tab, the workspace editor comprising a drag-and-drop interface where the second-level tab is movable relative to any other second-level tab under the first-level tab or movable to another first-level tab to change a layout of the workspace; and
in response to user input moving the second-level tab, updating the second-level tab's extension point and preceding extension in the XML code; and
validating the one or more user edits includes validating the second-level tab's ID, the name of the second-level tab's extension point, the other second-level tab's ID, the resource key of the second-level tab's label, or the name of the second-level tab's component class against the extension properties and the additional extension properties.

16. The method of claim 15, wherein:
extracting extension properties and extracting additional properties from the one or more plug-in XML, manifest files further comprise extracting action sets and actions;
presenting the GUI further includes:
presenting an available actions menu for creating, editing, or deleting an action or an action menu;
in response to user input to create the action, presenting an action dialog for editing the action's properties, the action dialog including:
an editable action set combo box for creating an action set or selecting the action set from a list of the action;
a text box for editing the action's ID;
an editable label combo box for editing a resource key of the action's label or selecting the action's label from a list of the labels; and
an editable icon combo box for editing a resource key of the action's icon or selecting the action's icon from a list of the icons; and
validating the one or more user edits includes validating the action set, the action's ID, the resource key of the action's label, or the resource key of the action's icon against the extension properties and the additional extension properties.

17. The method of claim 16, wherein:
presenting the GUI further includes:
in response to user input creating the action set, presenting an extension dialog for editing the action set's properties, the extension dialog including:
an extension information area, comprising:
a text box for editing the action set's ID;
an editable extension point combo box automatically filled with a name of the action set's extension point; and
an editable object type combo box automatically filled with the object type's ID as filtering metadata for the action set; and
an extension content area comprising a text box for editing a name of the action set's class or selecting the action set's class from a list of the classes; and
validating the one or more user edits includes validating the action set's ID, the object type's ID, or the name of the action set's class against the extension properties and the additional extension properties.

18. The method of claim 17, wherein:
presenting the GUI further includes:
in response to user input to create the action menu, presenting an extension dialog for editing the action menu's properties, the extension dialog including:
a text box for editing the action menu's ID;
an editable extension point combo box automatically filled with a name of the action menu's extension point; and
an editable object type combo box automatically filled with the object type's ID as filtering metadata for the action menu; and
validating the one or more user edits includes validating the action menu's ID against the extension properties and the additional extension properties.

19. The method of claim 18, wherein:
presenting the GUI further includes:
after the action is created, including the action in the available action menu; and
after the action menu is created, displaying the action menu, the action in the available action menu being movable to the action menu to add the action to the action menu; and
the method includes, in response to the action being moved to the action menu area, automatically updating extension properties of the action with the action menu's ID.

* * * * *